US011615694B2

(12) United States Patent
Kelly

(10) Patent No.: US 11,615,694 B2
(45) Date of Patent: Mar. 28, 2023

(54) CLEAN SURFACE SENSOR INDICATOR AND SYSTEM

(71) Applicant: Macondo Vision, Inc., Atlanta, GA (US)

(72) Inventor: Bryan McCormick Kelly, Kennebunk, ME (US)

(73) Assignee: MACONDO VISION, INC., Atlanta, GA (US)

( * ) Notice: Subject to any disclaimer, the term of this patent is extended or adjusted under 35 U.S.C. 154(b) by 0 days.

(21) Appl. No.: 17/307,435

(22) Filed: May 4, 2021

(65) Prior Publication Data

US 2021/0350689 A1 Nov. 11, 2021

Related U.S. Application Data

(60) Provisional application No. 63/020,504, filed on May 5, 2020.

(51) Int. Cl.
*G06T 7/73* (2017.01)
*G08B 21/24* (2006.01)

(52) U.S. Cl.
CPC .................................. *G08B 21/245* (2013.01)

(58) Field of Classification Search
CPC .......................... G08B 21/245; G06K 9/00355
See application file for complete search history.

(56) References Cited

U.S. PATENT DOCUMENTS

2006/0223731 A1* 10/2006 Carling ..................... B08B 3/00 510/156
2009/0070134 A1* 3/2009 Rodgers ................. G16H 50/80 705/2
2010/0328443 A1* 12/2010 Lynam ................... G06V 20/52 348/E7.085
2012/0116803 A1* 5/2012 Reid ...................... G16H 40/20 705/2
2012/0146792 A1* 6/2012 De Luca ................ G08B 21/22 340/568.1
2012/0173274 A1* 7/2012 Rensvold ............. G08B 21/245 705/2
2012/0206384 A1* 8/2012 Marsden ................. G06F 3/023 345/173
2014/0241571 A1* 8/2014 Bilet ..................... G06T 7/0004 382/103
2014/0244344 A1* 8/2014 Bilet .................... G06Q 30/018 705/7.28
2014/0327545 A1* 11/2014 Bolling ................ G08B 21/245 340/573.1
2017/0004357 A1* 1/2017 Bilet ....................... G06F 3/033
(Continued)

*Primary Examiner* — An T Nguyen
(74) *Attorney, Agent, or Firm* — Buchanan Ingersoll & Rooney PC

(57) ABSTRACT

Discloses is a workstation monitoring system. The system can include a camera configured to capture images and/or video of a workstation. The system can include a monitoring module configured to: receive images and/or video from the camera; identify a surface and a state for the surface, the state including any one or combination of occupied, vacant, clean, dirty, contaminated, attended to, or not attended to; track behavior of an individual, movement of an object, and/or an occurrence for the surface that causes a change in the surface's state; and generate a trigger event signal based on the change in the surface's state.

19 Claims, 31 Drawing Sheets

(56) References Cited

U.S. PATENT DOCUMENTS

| | | | | |
|---|---|---|---|---|
| 2017/0066020 | A1* | 3/2017 | Lapointe | G01N 21/94 |
| 2018/0221524 | A1* | 8/2018 | Johnson | A61L 2/0047 |
| 2018/0285649 | A1* | 10/2018 | Shi | G06V 10/751 |
| 2019/0117812 | A1* | 4/2019 | Olsen | A61L 2/26 |
| 2019/0299259 | A1* | 10/2019 | Marra | B08B 13/00 |
| 2019/0354753 | A1* | 11/2019 | Worrall | G09B 19/003 |
| 2020/0164988 | A1* | 5/2020 | Alvarez | B64D 45/00 |
| 2020/0250956 | A1* | 8/2020 | Hayes | G08B 21/245 |
| 2021/0027485 | A1* | 1/2021 | Zhang | G06V 10/82 |
| 2021/0030226 | A1* | 2/2021 | Broz | A47L 9/2826 |
| 2021/0030909 | A1* | 2/2021 | McDonald | H04W 4/80 |
| 2021/0124354 | A1* | 4/2021 | Munich | G05D 1/0088 |
| 2021/0280321 | A1* | 9/2021 | Weir | G06F 16/2379 |
| 2021/0350689 | A1* | 11/2021 | Kelly | G08B 21/245 |

* cited by examiner

Data base fields (typical)

| Site ID | ASSET/ SURFACE ID | Time | Validation Image (JPG) | EmployeeID | Check Mark Validation | Asset Description | LocationID |
|---|---|---|---|---|---|---|---|
| 15 | XZA523M | 2/21/21 10:31:15am | Ready182432.jpg | 123897432 | YES | Table34 | Restaurant |
| 15 | XYZ524M | 2/21/21 10:32:27am | Ready182433.jpg | 123897432 | YES | Table35 | Restaurant |
| 12 | A45Z988 | 2/21/21 10:32:28am | Ready687991.jpg | 432887326 | YES | Floor1 Hall-C | Hospital |
| 37 | 5G3G82C | 2/2/21 10:32:28am | Ready789332.jpg | 989898123 | YES | Game Machine-1 | Entertainment facility |
| 89 | 667TY432 | 2/3/21 11:37:29am | Ready898923.jpg | 888822313 | YES | Treadmill3 5 | GYM |
| 96 | 56RT487 | 2/3/21 11:37:40am | Ready323298.jpg | 898831134 | YES | Gate1/ Seat4 | Airport |

FIG. 3

FIG. 8
RED Indicator - Needs cleaning
GREEN indicator - clean
GREEN Indicator - just cleaned by
cleaning staff.
Available for next customer.
CLEANCAM (AI)
Divider between machines
GREEN
GREEN
RED
GREEN
RED
GREEN CART

GREEN Clean Sensor/Indicator (Surface is CLEAN for use)

RED Clean Sensor/Indicator (Surface needs cleaning)

FIG. 17
Face ID XYC3224
CLEANING
FLUID
GLOVE
MOP

CLEAN SURFACE SENSOR INDICATOR AND SYSTEM

CROSS-REFERENCE TO RELATED APPLICATIONS

This application is related to and claims the benefit of U.S. Provisional Application 63/020,504, filed on May 5, 2020, the entire contents being incorporated herein by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD

The field of the invention relates to clean surface sensors and indicators and associated systems. These sensors can detection when a surface has been cleaned by cleaning personnel and then visible indicators are shown indicating clean surface status. The clean surface sensors and indicators have an associated system that creates a cleaning compliance eco-system.

BACKGROUND INFORMATION

Surfaces in commercial properties that cater to consumers need to be regularly cleaned to limit the spread of bacteria and viruses. Consumers do not know if the surface is clean other than by visual appearance. But this is not good enough with today's concerns regarding highly infectious diseases like COVID-19. Businesses, like restaurants, typically clean a surface after patrons leave in a sit-down type location, but in a fast food business they often do not clean the tables in time before the next patron sits down. Businesses need to have better cleaning practices to ensure their customers are comfortable that this business is serious about their cleaning process. Some businesses schedule regular cleaning of surfaces like fitness equipment, tables, floors, shopping carts, etc. at regular period intervals, but the customers have no indication that this work has been completed for the device they are about to use/touch. Some businesses have cleaning logs that they maintain manually to keep a record of the cleaning time, location and attendant who performed the cleaning.

While these cleaning techniques have often been enough in the pre COVID-19 days there is a need to better provide a clean sensor/indicator system for consumers that the surfaces or devices they are about to utilize are clean and ready to for them use. There is also a need for a clean sensor/indicator system for employees to enable them to more optimally preform their jobs and clean only the surfaces that need to be cleaned. There also is a need for an automated system of record for managers, employees, regulatory bodies, and customers to ensure that the location is preforming its cleaning process to a high-level standard.

The foregoing examples of the related art and limitations related therewith are intended to be illustrative and not exclusive. Other limitations of the related art will become apparent to those skilled in the art upon a reading of the specification and studying of the drawings. Additionally, limitations and disadvantages of the related art may become apparent from review of other related art itself.

SUMMARY

In an exemplary embodiment, a workstation monitoring system can include a camera configured to capture images and/or video of a workstation. The system can include a monitoring module configured to receive images and/or video from the camera. The monitoring module can be configured to identify a surface and a state for the surface, the state including any one or combination of occupied, vacant, clean, dirty, contaminated, attended to, or not attended to. The monitoring module can be configured to track behavior of an individual, movement of an object, and/or an occurrence for the surface that causes a change in the surface's state. The monitoring module can be configured to generate a trigger event signal based on the change in the surface's state.

In an exemplary embodiment, a method for workstation monitoring involves receiving images and/or video of a workstation. The method involves identifying a surface and a state for the surface, the state including any one or combination of occupied, vacant, clean, dirty, contaminated, attended to, or not attended to. The method involves tracking behavior of an individual, movement of an object, and/or an occurrence for the surface that causes a change in the surface's state. The method involves generating a trigger event signal based on the change in the surface's state.

In an exemplary embodiment, a method for monitoring handwashing can involve receiving images and/or video of a handwashing station. The method can involve tracking behavior of an individual at the handwashing station to assess whether the individual washed their hands in accordance with algorithmic behavior rules; and generating a trigger event signal based on the assessment.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIG. 3 is an exemplary table of the data collected in a cloud-based cleaning database system associated with SAFE & READY stickers;

DETAILED DESCRIPTION

Figure 1:
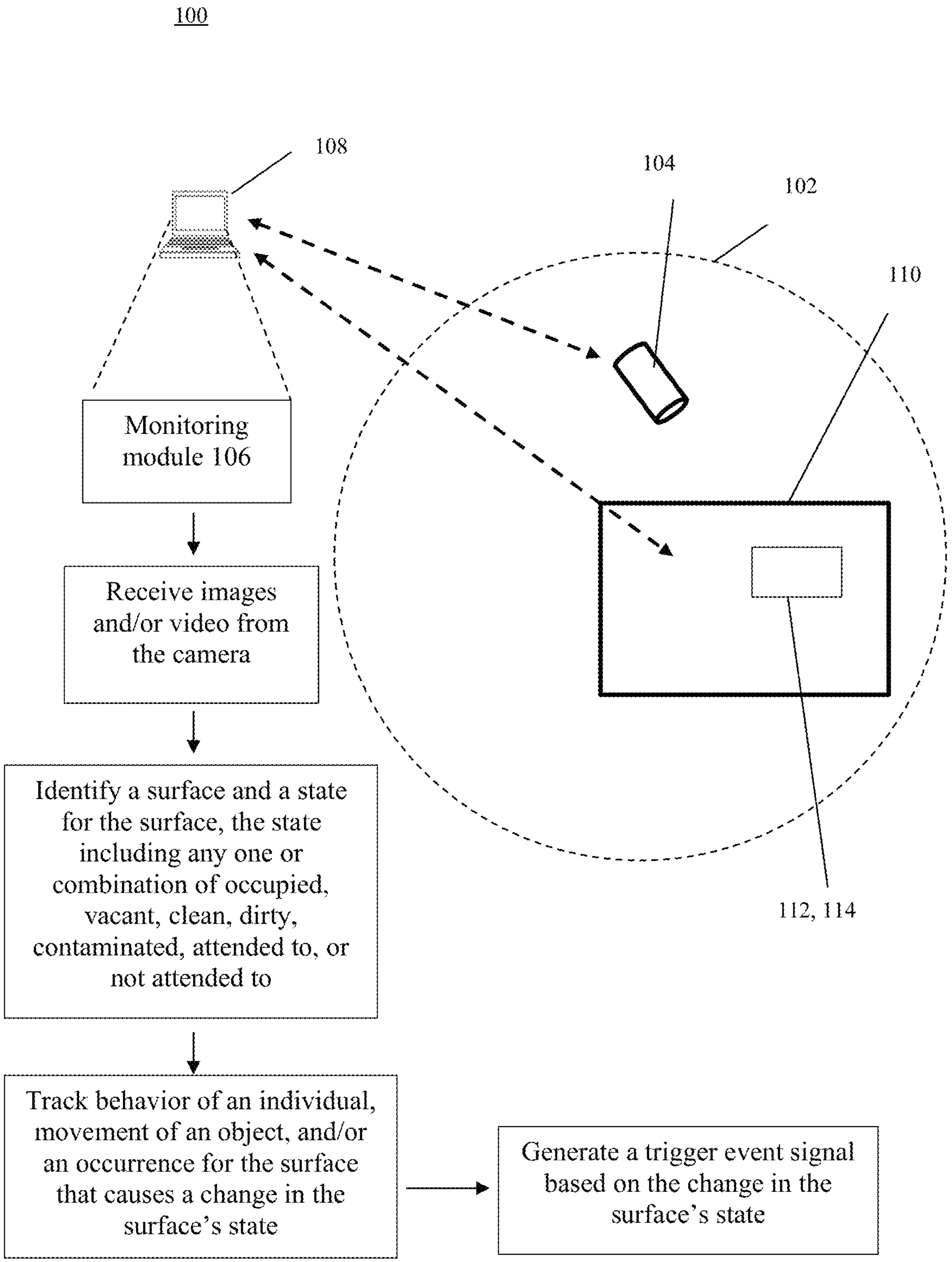
FIG. 1 shows an exemplary workstation monitoring system configuration.

The following embodiments and aspects thereof are described and illustrated in conjunction with systems, tools, methods which are meant to be exemplary and illustrative, not limiting in scope. In various embodiments, one or more of the above-described problems have been reduced or eliminated, while other embodiments are directed to other improvements.

In the following description, for purposes of explanation numerous specific details are set forth in order to provide a thorough understanding of the invention. It will be apparent, however, to one skilled in the art that the invention can be practiced without these specific details. In other instances, structures, and devices are show in in block diagram form in order to avoid obscuring the invention. These details are intended to be illustrative examples and not limitations of an inventive scope.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

It should be noted that the various clean surface sensor/indicators and associated systems mentioned in reference to specific embodiments may also be implemented via other embodiments even if it is not expressly stated to do so.

Embodiments described herein contemplate methods, systems and apparatus directed to clean surface sensor/indicators and systems associated thereof.

An embodiment, by way of a non-limiting example, provides a small adhesive backed sticker affixed to any surface to be cleaned or adjacent to that surface. A standard liquid cleaner is sprayed on the surface and the sticker by cleaning personnel and the surface is wiped down. Special white ink on at least on one portion of the sticker becomes transparent when it is WET and is normally white when DRY. Underneath the transparent ink is revealed colored graphics and text. These graphics/text provide an indicator to a patron/customer, so they know surface was recently cleaned. This gives comfort and knowledge the surface is clean and "ready" to touch. Overtime the sticker reverts to the DRY state over a time period as cleaning fluid evaporation occurs. This WET/DRY indicator is also used by the employees to denote when they need to clean the surface again on a regular periodic basis to ensure their customers safety. These stickers can have a unique identifier in them that is associated with the surface or device that they are affixed to. This unique identifier can be scanned and sent to system for tracking/compliance audit trail and maintenance purposes.

An embodiment by way of a non-limiting example, provides a mechanical based timer that can be activated by an employee after cleaning and then the sensor/indicator timer would then display a GREEN clean indicator to consumers. Then after the timer expires revert to a RED indicator to denote the surface needs to be cleaned.

An embodiment, by way of a non-limiting example, provides a small adhesive backed clean sensor/indicator electronic button that affixes to any surface to be cleaned or adjacent to that surface. A standard liquid cleaner is sprayed on the surface by cleaning personnel and the surface is wiped down. Then the cleaning attendant taps a magnetic wrist band to the electronic button. A magnetic sensor in the electronic button triggers an electronic configurable timer which in turn illuminates a GREEN LED indicator light on the electronic button or adjacent to the surface that was cleaned. The electronic button stays GREEN for a preconfigured amount of time. (example: 30 min). The cleaning personal can then move to other assignments in the facility. A customer/patron can see the GREEN LED indicator and knows that the surface has been recently sanitized and is ready for use. The GREEN LED indicator can reset by either timing out after the preconfigured time or by the customer/patron activating a reset feature/button on the electronic button or by the sensor detecting the patron has left. The customer may reset the sensor indicator to assist employees to let them know the surface needs to be cleaned now that the customer is leaving. The electronic clean sensor/indicator button may alternate to a RED LED color indicator at this time. The indicator light can be readily seen from a distance to aid employees and future customers which devices/surfaces are ready for use or need to be cleaned. This device can optionally send a wireless or wired signal to a centralized cleaning system for tracking/audit trail, maintenance purposes.

An embodiment, by way of a non-limiting example is an artificial intelligence (AI) camera-based cleaning sensor/indicator system that is observing a specific surface or device or multiple surfaces or devices in its field of view (FOV). At installation time, these surfaces are assigned a unique identifier (ID) in a computer-based system. Each region of the images taken by the camera are mapped to denote areas/surfaces of interest and those surfaces are assigned this unique ID. At runtime, the AI clean camera system can observe patrons/customers behaviors using and touching the equipment or surfaces. When the customer has left the vicinity of the surface area for an amount of time or has moved away by an amount of physical distance, the AI camera cleaning system can set a "must clean" event for personnel. An optional indicator light on or adjacent to the surface is changed to RED to denote that this surface is dirty and needs to be cleaned. This event can be a messaged to cleaning personal that this particular surface needs to be cleaned. The AI clean camera system can monitor when a human attendant is cleaning the surface and logs the event and monitors how much of the surface is cleaned by the attendant. The AI clean camera-based system can then change the optional indicator light on or adjacent to the surface to GREEN to denote that the surface is ready for the next customer to use. Alternatively, the employee can reset the clean sensor/indicator light using a magnetic or near field communication (NFC) enabled wrist band, or using a mobile device app. The AI clean surface camera system can create a record of cleaning events per employee to aid the business with quality of service metrics. The AI camera clean surface indicator system can leverage existing surveillance cameras in the locations and/or new AI clean surface cameras that are installed for this specific purpose.

Surfaces may be fixed in location or a movable barrier that creates a safe space around a particular location or machine or terminal. Surfaces can also be on moving items that can be tracked by machine vision.

SAFE & READY clean sensor/indicators and their associated systems can be installed in or on many different types of locations or surfaces including but not limited to: restaurants, bars, hospitals, skilled nursing facilities, nursing homes, assisted living facilities, medical clinics, doctor offices, dentist offices, pharmacies, markets, box stores, fitness centers, fitness equipment, grocery stores, shopping carts and shopping baskets, airports, tradeshows, conventions, front desks of businesses, security checkpoints, entertainment centers, factories, factory equipment, commercial, salons, massage therapy locations, hair salons, acupuncture offices, office buildings, schools, retail establishments, homes, apartments, school gyms, other dwellings, trains, buses, waiting areas, airplanes, service centers, automobiles, military equipment, AirBnB rentals, construction equipment, rental equipment, hardware stores, rental cars, autonomous vehicles, drones, robots, floors, walls, ceilings, doors, door knobs, various handles, tables, counters, bars, entertainment clubs, golf courses, golf carts, golf bags, golf clubs, chairs, benches, seats, stools, armrests, coffee tables, end tables, lamps, light switches, showers, fans, toilet seat, handles, movie theaters, boats, ships, bathrooms, kitchens, kitchen equipment, faucets, home and commercial appliances, cell phones, electronic equipment, furniture, brochures, books, boxes, packaging, bedrooms, hotel rooms, check-in desks, toys, daycare facilities, colleges, government offices, point of sale (POS) terminals, kiosk, self-service vending machines, checkout stands, beverage dispensers, vending machines, break rooms, coffee shops, libraries, civic center, wineries, food packaging, delivery packages, churches, parks and playgrounds, colleges, stadiums, stadium seats, arenas, concerts, theme parks, theme park/carnival rides/shows/equipment, chairs, seating, convenient stores, court rooms, lawyer offices, counseling offices, office cubicles, etc.

SAFE & READY cleaning sensor/indicators can be affixed or adjacent to partitions or dividers that separate humans from each other. They can be applied to glass surfaces or windows. These partitions or separators are often glass or plastic so the humans can see and communicate with each other. These partitions are especially prone to bacteria and viruses since they are in close proximity to where a person's breath leaves their mouth. The saliva or mucus droplets leaving the mouth or nose on exhale, sneeze or cough can contain virus or bacteria. Thus, these partitions need to have a regular cleaning process to ensure a safe zone for everyone. These partitions are also often touched by people and these viruses and bacteria can transfer by touch. It is expected that many locations where customers, employees, sit or stand very close to each other can benefit by partitions that create a safe space for each person. Places like stadiums, concert halls, theaters, integrated resorts, game entertainment centers, airplanes, movie theaters and the like may provide these partitions.

AI machine vision can detect if customers and employees are maintaining social separation by tracking their position in X, Y, Z space mapped to the known stadium coordinates. For example, if every other seat needs to be vacant then the machine vision can enforce this rule and send employees to this location. Cell phone location data combined with machine vision can be used for sensor fusion to find problem areas of social distancing and cleaning events can be triggered. Audio and other sensors that detect an amount of noise or talking can be used to decide a required cleaning event.

Figure 2:
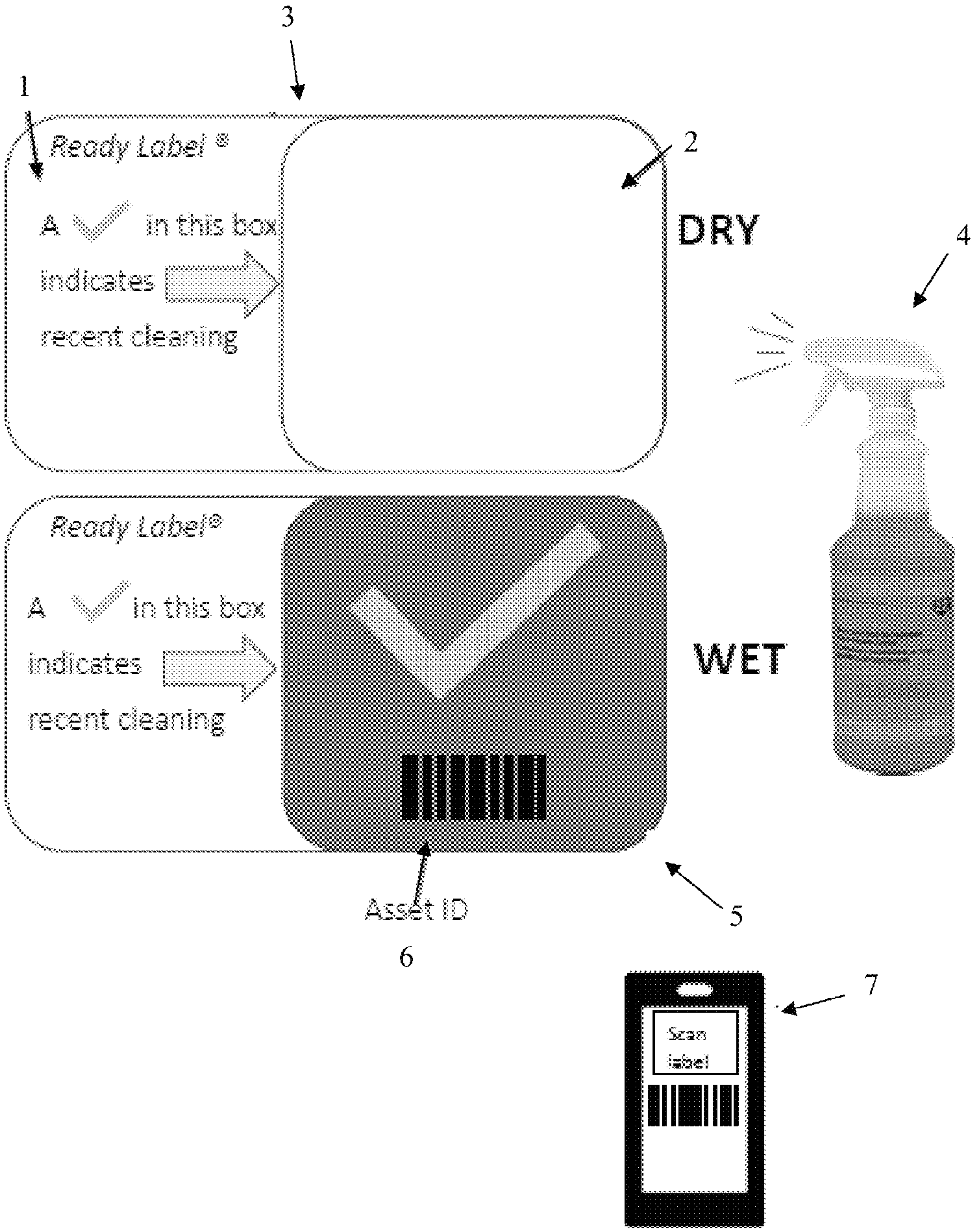
FIG. 2 is an illustration of an exemplary SAFE & READY sticker.

An example of a SAFE & READY sticker is shown in FIG. 2. The DRY sticker 1 is shown in the image. It is contemplated for the sticker to have some branding and words to tell consumers what to expect if the surface is clean. These words may vary per industry or venue or product it is mounted on. The sticker can be paper, wood, metal, plastic, stone, cloth, natural material, or other synthetic material suitable for printing with standard ink printing processes. The shape and size of the sticker can be different for differing applications. The back of the sticker may include an adhesive backing 3. This can include a backing that is common on business style stickers. 3M corporation is known to make very good adhesive material for permanent or semi-permanent mounting. The stickers can be configured to be resistant to damage by continued spraying of fluids on them. It is contemplated for a sticker installer to peel away a plastic adhesive barrier prior to applying the sticker to a clean surface. Other mounting techniques are contemplated by this disclosure such as screws, mounting, straps, brackets, and other mounting technique known to the industry. When a WET cleaning agent 4 is applied to the surface (the surface to which the sticker is attached) to be cleaned, the sticker also becomes WET from being in contact with the agent. A hydrochromic ink zone 2 of the sticker changes from WHITE to transparent. An example of such an ink is sold by Glomania.com (https://www.glomania.com/pigment/hydrochromic-pigment.html). Hydrochromic ink is known by other names including soaking fading ink, sympathetic ink, water sensitive ink, wet sensitive ink, and soaking discoloration ink. The Hydrochromic ink can be the topmost layer of a multi-layer ink printing process. Often this ink is printed using 200 mesh water-based silk-screen process. This technology has been used on diapers to indicate they have become soiled. Any fluid can be used to change the hydrochromic ink, turning it transparent.

In alternate embodiments custom ink can be designed by chemical engineers that is opaque and then changes color or becomes transparent and after chemicals that are found in cleaning solutions not limited to Windex, Lysol, bleach, or other cleaning solution are used. Colbalt chloride can also be used as a moisture sensitive material that can be used. The nice feature of this chemical is that it can change from blue to shades of pink or purple to bright pink which can draw attention to the color change. Thermochromic materials can also be used. They change color based upon the heat applied to them. A warm cleaning fluid may change the color of the material to make it visible to consumers or employees alike. Examples of this material are shown at www.colorchange-.com a division of LCR Hallcrest. Another embodiment for a "WET" indicator for the Safe N Ready sticker could use "Magic Paper". This paper changes from White to Black when moistened with water. The BuddaBoard (www.buddaboard.com) is a drawing tablet that uses this Magic Paper for inspiring artists to use.

It is contemplated for the Safe N Ready label to have two surfaces as shown in FIG. 2 where the special wet indicator surface changes color or becomes transparent when it is "wet" by a cleaning fluid of any kind. Clay and other stone surfaces can be used as well as the indicator surface. These surfaces are very durable and have a remarkable color change when "WET". They hold their moisture for a good period of time and will continue to show that the surface was recently cleaned by a cleaning attendant. Leather, charcoal, terracotta, and other natural materials can also be used since they markedly change color when wet and retain the "wet" look for good length of time. Moisture on any of these surfaces reduces the amount of diffuse reflection from the outermost layer of that material. When air fills the pores of the material from evaporation then the result is a lot of diffuse reflection due to light scattering effects. Certain portions of the substrate material may have penetrating sealers to mask out certain portions of the substrate. This way the water/cleaning agent wont penetrate this area of the substrate, and it will be less prone to change its optical properties when wetted by a fluid.

Hydrochromic ink allows the SAFE & READY sticker graphics 5 on the underside of the ink to be visible to the person. This SAFE & READY graphics 5 can be anything that draws attention to the customer that the surface is safe to touch since it has been cleaned recently. The Hydrochromic ink zone 2 will revert back to WHITE over a period of time as the area dries up through evaporation or exposure to oxygen. For example: after 1 hour the material in that Hydrochromic ink zone dries and the SAFE & READY graphics 5 disappear. This will denote to cleaning staff that they should clean the surface again. It will also tell future customers that this surface should be cleaned prior to using it just to be safe. Words or graphics can be printed in this zone that help customers in that establishment know the surface was recently cleaned. The cleaning staff at that location will learn how long the dry process of the ink is and can then schedule their return for the next cleaning. In moist humid environments the hydrochromic ink may take longer to dry (example 1 hour). In dry environments the hydrochromic ink may dry in 30 min. The cleaning attendant may decide to moisten the sticker more with cleaning fluid to ensure the period is extended.

In alternate embodiments, the entire sticker can have hydrochromic or similar ink. The SAFE & READY sticker can be made with different materials to ensure that the cleaning agent 4 does not evaporate for a longer period of time. For example, a cloth-based material will absorb and keep the moisture for a longer period of time than would plastic or paper. Stickers could be designed to have specific WET times (say 1-hour, 2-hour, 30 min, etc.) before they revert to their dry state (dirty state). It is also contemplated by this invention that chemical engineering can construct cleaners and inks/materials that change color state or transparency for a predetermined time after mixing. For example: the SAFE & READY sticker could be RED in color and switch to all GREEN in color after a cleaning agent is applied. Other chemical type reactions are contemplated by this invention. In one embodiment, special chemicals are added to the cleaning fluid that when sprayed on the SAFE & READY clean indicator sticker it will change the indicator to a different state for a period of time. This chemical process technique can force establishments purchase the correct type of cleaner that activates the sticker, or force an employee to use a correct type of disinfectant/sanitizer for a certain surface.

In an alternate embodiment, the messaging to the consumer about the function of the SAFE & READY sticker can be in the inside or surrounding the wet surface indicator zone. A non-limiting example is a round sticker with a hidden green check mark may be surrounded with the sticker messaging to the consumer. When the surface is wetted the hydrochromic ink changes color and the green checkmark becomes visible.

In FIG. 2 there can be a unique identifier 6 of this particular SAFE & READY sticker. This identifier can be a barcode, QR code, RFID tag, NFC tag and other unique identifier(s) that can be printed on or embedded in the SAFE & READY sticker. This identifier may be hidden under the hydrochromic ink when the sticker is dry and only visible when the ink is wet and therefore transparent. If the hydrochromic ink becomes opaque when wet, such as the Rainworks product—https://rain.works/invisiblespray/—then the identifier may be partially or completely printed with the hydrochromic ink and thus only legible when wet. This unique identifier 6 is read by a scanning device 7 that can upload the information to a central cleaning service database for record keeping. This scanning device 7 can be a mobile handheld device like a mobile phone or other wireless reader. The cleaning attendant personnel and company can use this event to prove they have cleaned the specific surface at a specific date and time. A secure mobile app can be used to capture the image of the sticker with the barcode, time stamp it, and then send this to a server with the employee ID. The server can validate that this tag is active in the system, assigned to a specific surface, do image processing on the sticker to ensure it shows the proper graphics/image in the WET zone 5, etc.

In one embodiment, cameras mounted in the facility can view one or more surfaces that have SAFE & READY stickers. The cameras can have the images evaluated by machine vision to see if the markings/text under the hydrochromic ink can be seen for that surface. The camera can be, or be a part of, a camera base AI system configured to log the time that the surface is cleaned. It can optionally read the biometrics or ID tag of the cleaning personnel for an audit trail of who cleaned the surface. Thus, the entire transaction of cleaning the surface can be automated and not require the cleaning attendant do anything other than spray the cleaner and wipe down the surface and SAFE & READY sticker.

An alternate embodiment of the SAFE & READY sticker uses different types of ink activation means including thermal, magnetic, or light activated materials. These types of materials can change state or color in some fashion to make a clear indication to the consumer that the surface is clean or not recently cleaned. It is contemplated for these other materials to revert to their RESET state (DIRTY) over time based upon their properties and optionally the environmental conditions. In some embodiments, the service employee can have an activation device or process to make the indicator show the 'recently cleaned' image or color. It is important to note that hydrochromic ink is just one way that a 'recently cleaned image or color' indicator can be activated and visualized. For instance, ink nanoparticles can be applied to the surface and "activated" to change the color indicator "GREEN". These nanoparticles can be activated by a chemical reaction or a handheld device activator. Over a time period these ink nanoparticles can revert to their original color (RED for example).

An alternate embodiment of the SAFE & READY sticker has an employee affix a sticker to the surface after cleaning and the sticker can change color or appearance over time as it is exposed to the environment or oxygen—e.g., it is a time expiring ink. Time expiring inks are well known in the art. Companies use this type of ink in guest badges that expire (change color) after 24-hours. This gives a visual indicator that the guest permissions have expired and should leave the facility. The SAFE & READY clean sticker can use similar technology and would have information for the customers to convey that if they see certain markings on the sticker then the clean surface certification has expired. Inks and printing processes can be calibrated to print SAFE & READY stickers with different expire time periods like (1-hour, 3-hours, 6-hours, 24-hours, etc.). These types of expiring SAFE & READY stickers could also have a unique barcode or RFID tag inside of them that can be scanned by an employee handheld reader/mobile app to upload the data to a central database. These types of stickers typically may be configured to only be used once and will have to be replaced on the next cleaning, whereas other types (e.g, hydrochromic ink type stickers) can be reversible to the WHITE color state and allow the SAFE & READY sticker to be used again and again.

In some embodiments, SAFE & READY stickers can be applied to cell phones or their cases, for example, to help people know that their phone needs cleaning.

Figure 2A:
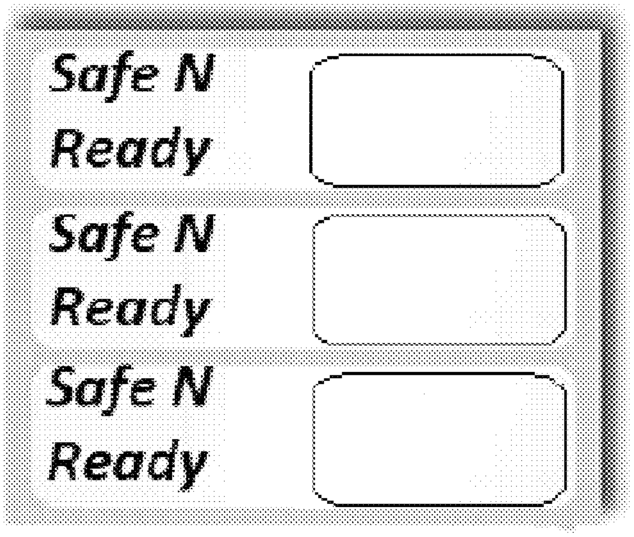
FIG. 2A is an illustration of an exemplary SAFE & READY sticker on sheets or rolls that allow a person to peel one off and affix to any surface that is periodically cleaned.

Referring to FIG. 2A, the SAFE & READY sticker can come in rolls or sheets. Thus, users can peel one off the sheet or roll and then affix to the surface to be cleaned. The adhesive on the back side is contemplated to be very strong and can withstand many fluid cleanings without needing to be replaced.

FIG. 3 shows a typical clean surface system database table that would store information on SAFE & READY stickers and the transactions associated with them. It is contemplated for a site ID to be used as an indicator of the location that the sticker is located. The site ID may also be associated with a specific business partner like a retail food chain, fitness gym, etc. For instance, the SAFE & READY sticker can be affixed to a specific asset/surface ID in that enterprise. The time stamp can be the chronological time that the image is uploaded by the cleaning attendant using a mobile device. The validation image can be the image captured by the camera on the mobile app used by the cleaning attendant. The employee ID is the cleaning attendant ID for that enterprise. The check mark validated flag is set to true or false after image recognition/analysis software compares it to the approved image for that business partner. The asset descriptor is the name of the asset in the enterprise (for example Table 34 in a Restaurant).

It is contemplated for a complete audit trail of cleaning per employee to be generated per location per asset ID and be available for managers of each location. Cleaning event triggers can be configured after a set period of time to let the cleaning team know when to clean specific surfaces. The cleaning audit system allows for a continuous improvement process for the enterprise so that they maintain a quality of service that both their customers and employees require. Performance reports can be available for each employee.

In an exemplary embodiment, a clean surface sensor indicator can include a first portion of the indicator that shows a clean surface message, a second portion of the indicator that, when moistened, changes from a first state indicator to a second state clean surface indicator. The second portion of the sticker reverts to the first state indicator over a period of time. The sticker can be a typical paper/plastic sticker that can be purchased in an office supply store. Alternatively, the sticker can be a ridged material like wood, plastic, or metal that can be affixed to a surface by adhesive or mounting screws or other mounting techniques. In alternate embodiments, the entire surface like a table, bartop, front face of electronics device can be covered with the hydrochromic or other indicator material or ink. The entire surface can be white, for example. When an employee wets the entire surface with cleaning agent and rag then then those portions of the surface become transparent and the clean surface indicator message is shown to the customers for a period of time until evaporation occurs. For example, the entire surface may reveal a green surface with words like "This surface was just cleaned for you and is ready for use". "If you can't see this message then the surface should be cleaned". Other chemicals or materials than hydrochromic ink on flexible plastic sheets can be used as long as the surface clearly changes after a wet solution, cleaner, or custom cleaner has been used on the surface. The advantage of this whole surface clean surface indicator is that as sections of the surface revert back because of evaporation then the customer will see some zones that are still "clean" and some that are "needs cleaning". This will also give the cleaning personnel a perfect way to see if they are properly cleaning all the surface because it will completely change to the clean indicator when done fully.

Figure 3A:
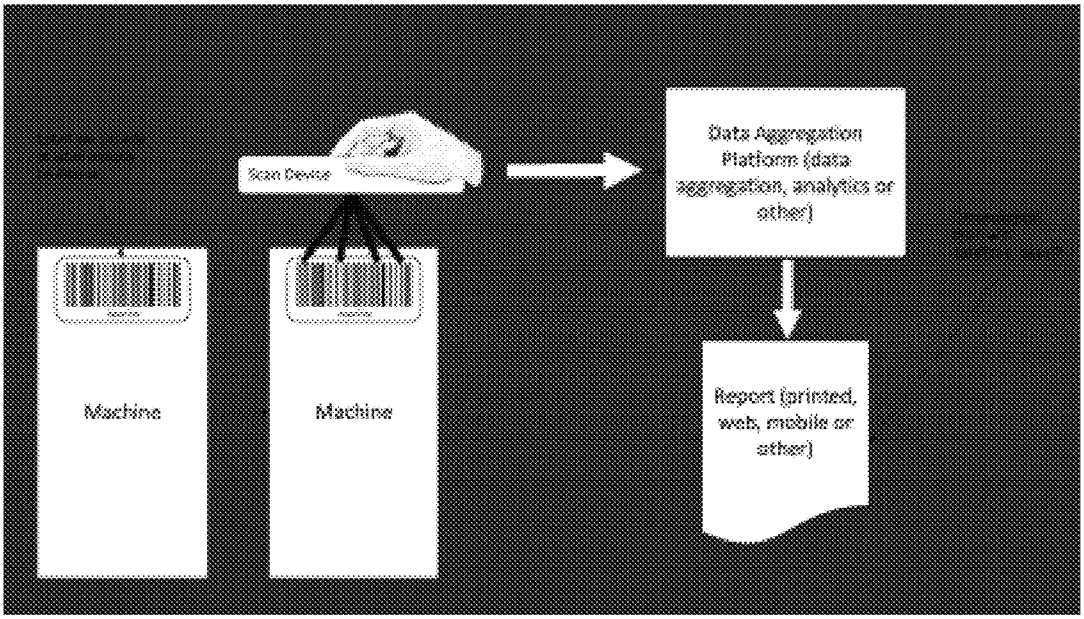
FIG. 3A is a diagram of barcoded stickers that can be affixed to any device or surface where they can be scanned and uploaded to a clean system database.

FIG. 3A is a figure of 1D, 2D or other type of barcode identifier or RFID tag, RFID, NFC tag on a SAFE & READY sticker. These stickers can be affixed to any surface or device. They can have the hydrochromic ink sensor or just be simple stickers with the barcode or other sensor embedded into the sticker. After cleaning a surface, an employee handheld device can be used to scan the sticker and sends the unique identifier of that sticker with the employee ID and the time to the a centralized clean and ready system that can log all events as described in FIG. 3. Reports and analytics can be periodically run to provide businesses the compliance documents they need to ensure they are living up to their industry and company cleaning requirements.

Figure 4:
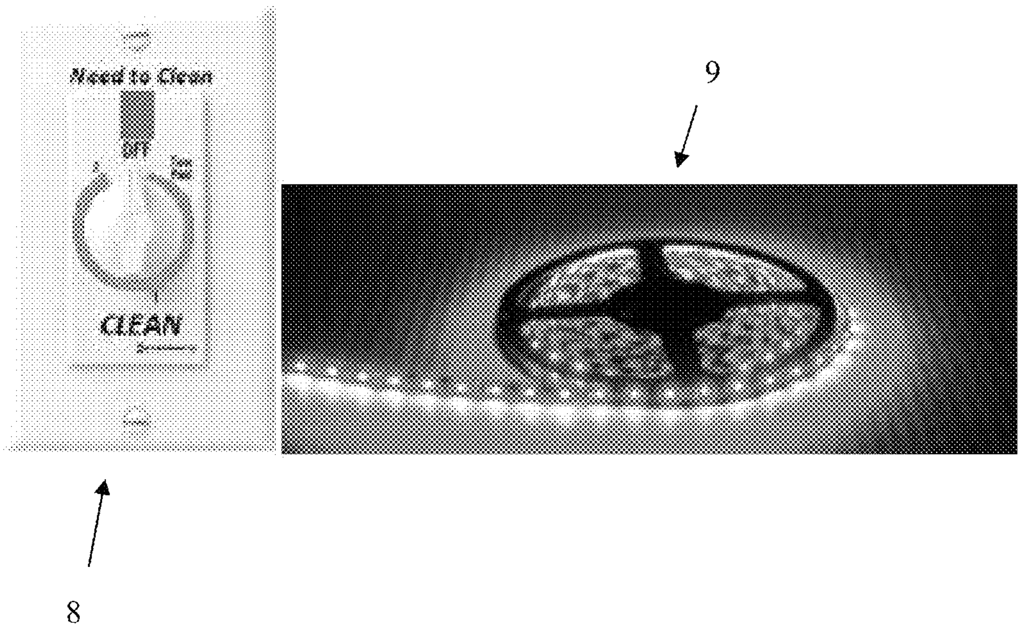
FIG. 4 is an exemplary mechanical timer that can be turned by a cleaning attendant to illuminate an indicator light after the surface has been cleaned.

FIG. 4 shows an alternate embodiment of a clean surface sensor/indicator is a mechanical based rotary spring-loaded timer 8 provided by firms like the Intermatic company. This timer can have an optional locking mechanism like a magnetic latch or key that when released allows the cleaning attendant to rotate or slide the spring-loaded mechanism to the "clean surface" indicator position. This can prevent customers from rotating the mechanical timer. A color-based indicator can be used on this embodiment to aid customers and employees when the surface is recently cleaned or needs cleaning. One advantage of this mechanical spring-loaded version is that the clean indicator can have an accurate reset timing mechanism as the spring timer mechanism returns the indicator to the "home" position. At this point the mechanism can activate a relay and show or illuminate a RED color indicator 9 to denote the surface needs cleaning. The magnetic latch can be used to prevent unauthorized customers to move the indicator to the GREEN or "CLEAN" state. This gives customers comfort that employees had performed the cleaning task and an indicator of the amount of time ago this was done is shown. These mechanical based timers 8 can be linked to LED indicator light(s) 9 that are affixed to movable or fixed barriers in retail establishments to help prevent the spread of the aerosols that are emitted from human breath, cough, or sneezing.

Figure 5:
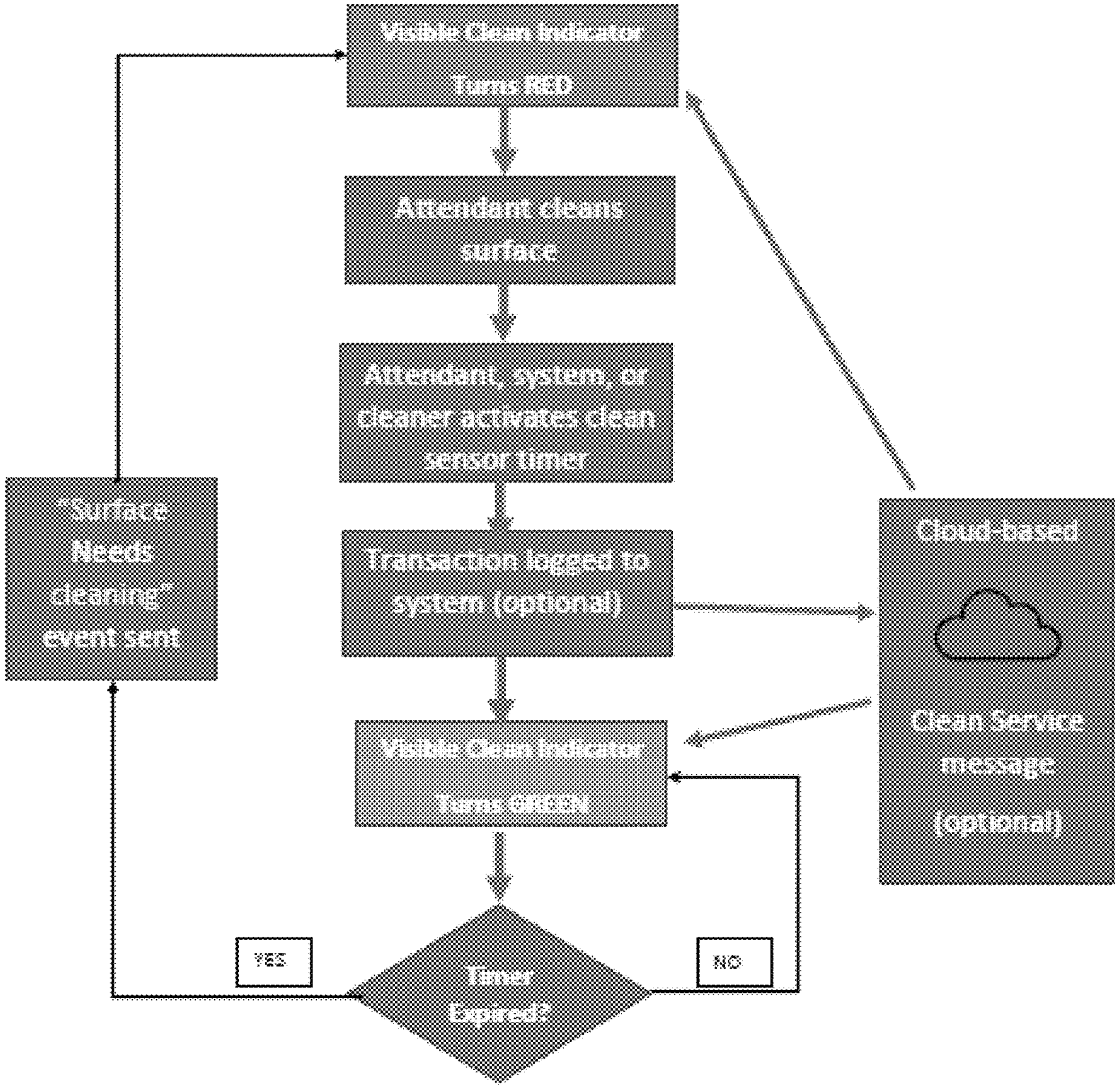
FIG. 5 is an exemplary flowchart of the clean surface sensor/indicator process.
Figure 6:
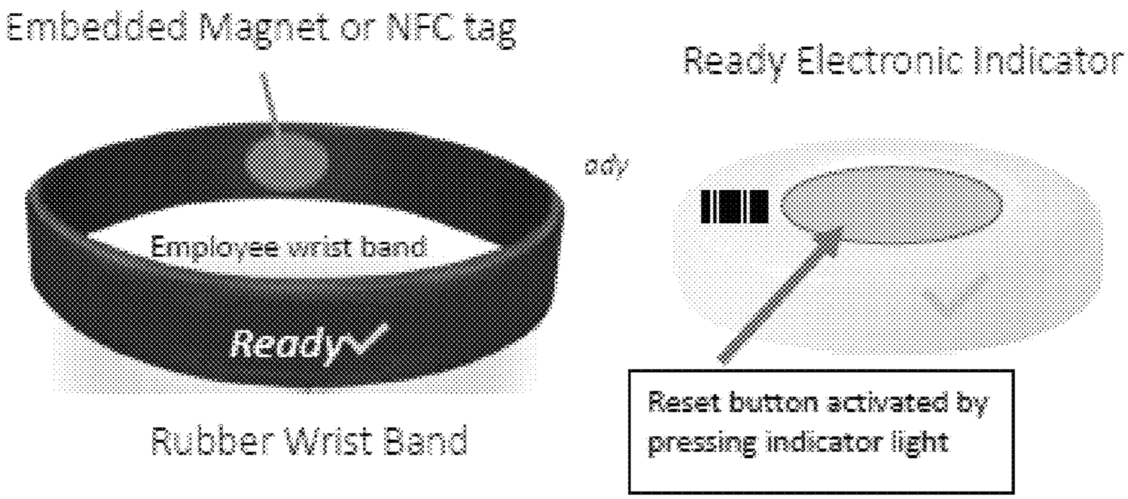
FIG. 6 is an image of an exemplary adhesive backed electronic clean sensor/indicator button and an exemplary rubber wrist band with embedded magnet associated with the sensor/indicator button.

FIG. 5 shows a flowchart of an exemplary clean surface sensor/indicator process. In the first step, the indicators are shown to customers and employees that the product needs cleaning. This can be done with a RED indicator if the device is electronic. The attendant then cleans the surface with approved cleaner and cloth wipe. The cleaning process or the attendant can then activate the indicator and its associated timer by an action. These actions include but are not limited to: spraying on the sticker label with a WET cleaning fluid, turning a mechanical timer knob, using a key, pressing a button, holding a magnetic item next to the indicator, tapping an NFC tag or NFC reader to the clean surface indicator, holding a Bluetooth low energy device next to the clean surface indicator, etc. The purpose of this step is to help ensure that employees are the only ones that can reset the timer and change the visible indicator. The next step for electronic device is to send a RESET or CLEANED SURFACE transaction log up to a server if it is connected. This can be done by scanning the clean surface indicator with a handheld reader like a mobile phone associated with an employee or uploaded through a network linked to the clean surface sensor/indicator electronic device. The next step in the process is the visible clean surface indicator changes color to GREEN or other bold color to denote to the customer and employees that this device is now "CLEAN" and ready for use. The processor then decides if the timer has expired for this clean surface sensor/indicator and then an event is triggered and the clean surface sensor/indicator changes color to RED to denote the surface needs to be cleaned. This process can be configured to repeat continually. Note: the visible indicator can be nearly any mechanical, audio, visible indicator that clearly shows the surfaces clean or needs cleaning state. In some embodiments, a cloud based cleaning service can directly message the clean surface sensor/indicator to change its color for employees and patrons FIG. 6 is an exemplary electronic clean surface sensor/indicator and a wrist bracelet that may be worn or lanyard around the neck or on the employees during cleaning. This wrist band can have a magnet inside it that, when in proximity to the electronic clean surface indicator, a magnetic hall effect sensor inside the clean sensor/indicator senses the wristband magnet and resets the internal timer in the circuit or processor. Then the clean sensor/indicator changes to the ready indicator color (e.g., GREEN) or a display on or near the device changes. The clean surface sensor/indicator button has an adhesive backed surface to attach to nearly any surface. The 3M corporation has adhesive backings materials suitable for the application. The indicator light or display may be located separately from the electronics in the button. Also, the magnetic sensor can also be at a separate location on/near the surface being cleaned. This may be to aid cleaning personnel with resetting the device after they clean the surrounding surface area. These electronic clean sensor/indicator buttons may have words printed on them or adjacent to them. These words can denote to the customer that the surface is recently cleaned or not. It is important that the customer readily understands that this surface and the surrounding area are clean and ready for use. The wrist bracelet may be in other forms for the cleaning personnel and may be in the form of a ring, a card, or attached to something the cleaning staff has on their body or arms as they clean. The goal is a very quick proximity "tap" that would reset the timer and clean surface indicator lights. Care must be taken to not burden the cleaning personnel. The clean surface sensor/indicator electronic button can take many different forms based upon the installation requirements. For example, the indicator may be wide and thin to mount on a shopping cart handle in a grocery store. It may have the indicator light on the ceiling above a dining room table in a fast food business, but the sensor or other electronics may be located on the table or wall next to that specific table. It is contemplated to be easily accessible by the cleaning attendant. The electronic clean surface sensor/indicator can also include a barcode on the surface that can be scanned or photographed by the cleaning attendant and sent to the central cleaning database for auditing.

Figure 7:
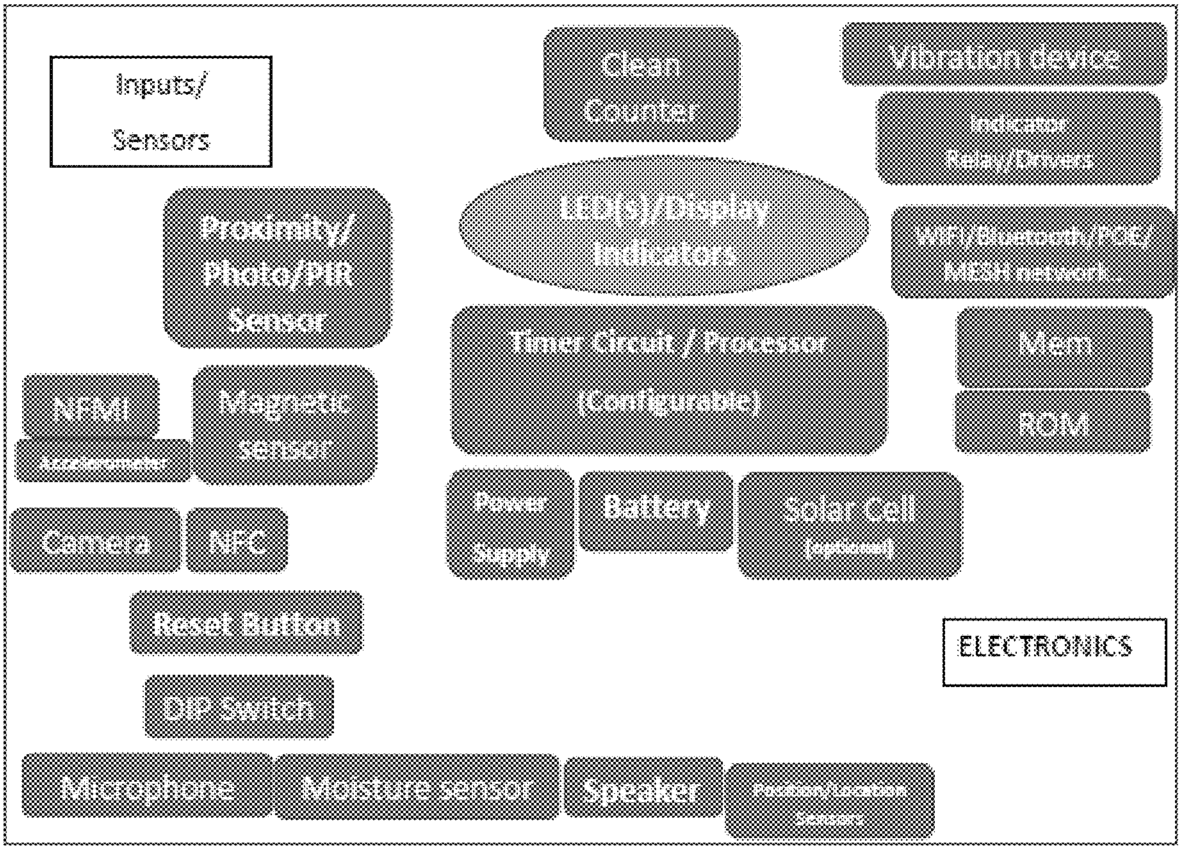
FIG. 7 is an exemplary architecture illustrating internal components of an exemplary adhesive backed electronic clean sensor/indicator button.

FIG. 7 shows an exemplary architecture of the internal components of the adhesive backed electronic button used as a clean surface sensor/indicator. The LED/display indicators may include one or more LED light emitting diodes (e.g., RED and GREEN), a countdown timer display, an e-INK display, and LCD or LED display and OLED display, or a colored material or otherwise specially marked material that is mechanically shown after activation. The heart of the electronics is the timer/processor circuit. This can either be a simple timer like a 555 timer IC or can include very low power processors like an STC 11F02E from STC Micro capable of running timing logic, digital I/O, analog I/O and other associated logic. The input sensors can include a proximity sensor, photodiode emitter/sensor, PIR sensor, pressure sensor, capacitive touch sensor, humidity sensor, RGB sensor, time of flight (TOF) range finder, vibration sensor, ultrasonic range finder sensor, Intel Real-Sense depth camera, Lidar sensor, flex sensor, or a camera capable of determining when a person or object is cleaning the surface or occupying the surface like a customer. The timer/processor circuit can use these data to decide that the surface needs cleaning after the proximity sensor determines the customer has left.

The proximity sensor can sense people in the field of view of the sensor. This field of view may be configured at sensor installation. Clean sensor/indicator may have field of view markings to aid in the installation crew's ability to aim at specific locations of interest.

In one embodiment, the photodiode or camera sensor can be covered with hydrochromic ink on the outside of the electronic button case. When this surface is wetted with cleaning agent then it becomes transparent. Then the photodiode voltage changes since the room light is now detected, and the processor uses this as a trigger that the cleaning attendant has cleaned the area. This creates an automated "proof of clean" audit trail verses requiring the cleaning attendant to take a separate step (like swiping the magnetic wrist band) to tell the electronics that the surface is now clean. The proximity sensor can also be a time offFlight (TOF) or PIR sensor that measures distances to objects or persons. This distance information can be processed by the processor and a determination is made when humans are present or not. This can be used to start and stop timers for different events.

When the cleaning attendant finishes cleaning the surface, he/she may bring the wristband with embedded magnet towards the electronic button clean sensor/indicator. The hall effect magnetic sensor senses the magnet in proximity to the electronic button. When this magnetic sensor is activated, the timer/processor circuit resets the timer to the "Clean Surface" mode and lights the indicator light to GREEN color. An NFC tag is an optional feature inside the electronics. This can be used with an external device such as an employee cell phone app or other reader to read the tag. The unique ID is transmitted from the NFC tag to the NFC reader and this is used to upload the information to the servers to denote the time, location, asset/surface ID, employee ID who performed the cleaning, etc. Alternatively, the NFC tag can be with the attendant and the NFC or RFID reader is on the electronic clean sensor/indicator button. The button can read the unique NFC tag identifier, log the event time, and send these data to the server(s) for reporting purposes. An alternate embodiment of the employee reset mechanism verses the NFC wrist tag is an optical handheld controller that sends and IR or wireless signal to the cleaning sensor/indicator to change the lights from RED to GREEN and to do other various configurations.

FIG. 7 includes a clean counter indicator that can be an electrical, mechanical or other display that shows the quantity of cleanings, time of last cleaning and other cleaning data associated with this surface or device. This can be used for audit trail/compliance purposes. This counter can be incremented when the employee resets the timer after cleaning. The clean counter indicator with a clean sensor unique barcode can be photographed or scanned and uploaded to a central clean audit database. This would can occur on non-networked devices and an employee's handheld device could do the scan. The indicator may also or alternatively show the last time the surface was cleaned, or when the timer expires, and the next cleaning is needed.

A rest button mechanism can be provided to the customer or employee who wishes to reset the timer/processor circuit and put the device into the "Not Clean" state. The reset button can be readily accessible to the customer. The reset button can be a switch or other sensor capable of being activated. At this time the indicator lights can then turn RED. A patron/customer can do this to let the service staff know that this station needs to be cleaned immediately because the patron is concerned about the cleanliness or he/she is leaving and wants to be courteous to the next customer. DIP switches, potentiometers, etc. can be used by employees to configure the timer circuit duration (30-min, 1-hour, 1.5-hour, 2-hours, etc. . . . ). These configuration switches may be set once and left that way after installation at that particular location/surface.

There can be networked and non-networked versions of the clean surface sensor/indicator button. If the device is networked the timer/processor programming can be fully changed on demand from the server based upon rules or new firmware sent to the clean sensor/indicator button. A microphone/audio sensor can be an option to detect when a person is present or not at a particular location. This can be a person or a cleaning attendant. This audio can use simple threshold levels of sound or sophisticated machine learning to make the determination if the indicator lights should change and the timer triggered or reset. Alternately, NLP (Natural Language Processing) can be utilized, wherein keywords said by cleaning attendant to denote they have cleaned the surface can be sensed. This NLP system can also detect presence/absence of activity of customers at the location indicating when the surface should be cleaned. An external or internal power supply is one way to power the electronic clean sensor/indicator button. Alternatively, a battery (e.g., CR2032s) or charging type battery is used to provide power to the electronics for a fully battery-operated electronic button. A solar cell is an option for the product that can charge a re-chargeable battery and provide 24/7 power in lighted locations. The electronics are extremely low power, but the indicator lights consume enough power so they be seen by customers and employees alike. Memory is provided for the timer/processor circuit code storage and program execution and to save memory/event state required for the computer operation. This memory can be battery backed or in EEPROM and can store audit logs for later upload over wired or wireless link. A real time clock (RTC) can be provided to provide accurate timing for logs. The sensor/indicator device can optionally include WIFI/Bluetooth/POE or other IOT interface ports are provided to allow this electronic button to communicate to servers or wireless devices. This is common for IOT (Internet of Things) devices. The electronic button can take many forms, and the version shown in FIG. 6 is for reference only.

In one embodiment, the electronic button receives signals from servers or mobile handheld devices that tell the indicator light to change state from RED to GREEN. In the machine vision implementation of this invention, a message can be sent after artificial intelligence (AI) processing determines that an employee has cleaned the surface and the indicator button light can then turn GREEN. Conversely, the light can be turned RED when a customer uses the surface and AI determines this event. The board can have a relay driver that can drive high voltage or low voltage AC or DC lamps, solenoids, to indicate the clean state. The timer/processor circuit can PWM pulse width modulate the light driver to limit battery use by controlling the duty cycle of the ON/OFF time of the LEDs or other Indicator lights. Audio speaker output indicators can also be available to denote that the surface needs cleaning. This can be a small chirp or periodic audio phrase "attendant alerted to clean this surface" or similar phrase. A visible indicator like a LED light or display can be used for clean sensor/indicator but other output devices are contemplated, such as speakers, buzzers, mechanical vibration devices, etc. A visible indicator light, display, or other output indicator can be separate from the clean sensor/indicator electronics. Long wires or messaging from the electronics to the Indicator lights or other output device can be used to enable this.

An e link display can be used with or without an associated battery. When an employee mobile phone with NFC is placed in proximity to the e Ink sensor/display indicator then the display updates with the time the cleaning occurred, and the time that the next clean is to take place. The mobile app transfers the image to the e Ink display. A battery in the device can automatically change the e Ink display periodically when the display expires or at other times. A microprocessor in the device can expire the e Ink display and then it would say the surface needs to be cleaned by use of colors and/or words. e Ink shelf display tags can be deployed in various retail shopping businesses. The e Ink sensor/indicator light disclosed here has an integrated countdown timer to change the display to denote the surface cleaning has expired. Other relevant information related to cleaning can be indicated on the e Ink display.

Referring to FIG. 7, a moisture sensor can be included in the clean sensor/indicator electronic button package and exposed on the outer package surface. The moisture sensors can be provided by firms like RFMicron's RMF2100 and other firms that have electrodes that change voltage or capacitance when exposed to fluid like cleaning agents. Another firm that provides non-corrosive moisture sensors is the DFROBOT Gravity: Analog Capacitive Soil Moisture Sensor. Also, a relative humidity sensors can be used. These sensors can be used to sense cleaning fluid has been applied to the surface to be cleaned, wherein the timer/processor circuit in the clean sensor/indicator can change its state to "CLEAN" and illuminate the GREEN light. Any sensor capable of sensing any fluid or a specific type of cleaning fluid can be used as a trigger for the clean sensor/indicator.

The processor can be a Sipeed MAIX Bit Suit with LCD and camera from the SEEED studio company or other smart IOT low power device. Alternatively, the Microchip PIC10 (L)F320/322 8-bit microcontroller is suitable as the extremely low power processor to have inside the clean sensor/indicator electronic button.

The device can communicate with a host device using a NFMI transceiver NXP NXH2261 and a Texas Instrument LP5569 LED driver. This technology allows magnetic communication of data from the controller to another device that has the same technology, for example one carried by the cleaning personnel. The CPU can be the ultralow power NXP KL27 ARM-Cortex MO+Microcontroller. An open-source example of the technology is shown at www.grandidestudio.com/defcom-27-badge/.

Figure 8:
FIG. 8 illustrates an exemplary use of an embodiment of the system, the exemplary use being for tables or terminals for customers in retail or commercial environment.

FIG. 8 shows two tables in a retail establishment and is illustrative of a type of deployment in a restaurant. However, the sensor indicators may be associated with any type of equipment or surface in any business or home setting. The restaurant left table shows a RED indicator light to the consumers and employees indicating that this surface needs to be cleaned since either the time has expired since the last clean or a proximity system determined that a customer(s) has just left the table. Employees would see this light being RED or would be dispatched to clean the surface through messaging means. The right table is currently occupied by people/customers and doesn't need to be serviced for cleaning. The indicator light would be GREEN for this case. This aids the customer in knowing that the table is recently cleaned as well. Some tables may have more than one clean sensor/indicator button. The optional proximity sensor on the clean sensor/indicator can keep the indicator GREEN while customers are present and using the surface. Alternatively, once the proximity sensor is first triggered, the indicator may be changed to AMBER—to indicate that the surface is in use. The proximity sensor can sense people in the field of view of the sensor. This field of view can be configured at sensor installation. Clean sensor/indicator may have field of view markings to aid in the installation staff ability to aim at specific locations of interest prior to mounting. The bottom table in the image has a GREEN indicator on the table denoting that it was recently cleaned by employees and is ready for the next customer. This will provide a significant advantage to customers in selecting the right table to sit at. Even though a table surface may not have any plates, cups, napkins or other things from the last customer, it may not be clean from a bacteriological and viral sense. Such a table would have an AMBER or RED indicator light—AMBER if the table had been very recently used (say, less than 10 seconds ago), then RED when it is clear that the last customer(s) have left the surface permanently—signified by a proximity, motion or other type of sensor showing no presence for a period of time. Without the GREEN light the customer may think the table is safe because it looks clean. With the GREEN sensor/indicator light the customer would know the table is recently cleaned prior to this specific use. The sensor/indicator on the table or placards on the wall may tell the customers what the GREEN light means for that business. For example, the words may say "Green light indicates table was cleaned after last customer" or "Green light indicates table was cleaned in last 30-min". These sensor/indicator lights may be manually changed by the cleaning staff or a command has been sent to the device over a network from centralized servers controlling a group of sensors. FIG. 8 also shows a camera in the image that may oversee a whole group of surfaces or tables in a location. Machine vision can be used to sense occupancy of specific tables, when cleaning staff have cleaned the table and when to change the sensor/indicator light to a different color. Applications like Opentable can be notified of the clean table, so they can make the table available for the next guest. In some embodiments, multiple SAFE & READY clean sensor/indicators can be affixed to different portions on the same surface.

FIG. 8 also shows game terminals or self-service kiosks in locations that can also have clean sensor indicators associated with them. The sensor indicator system can perform the same as described above or can also include a means to detect presence of a player. This can be using proximity sensors or by monitoring the game platform activity through network means. Most game machines/kiosk have a network of data that logs game play or usage activity and optionally the player ID to centralized servers. This data can be used to decide when to trigger the clean sensor/indicator change to denote the machine/kiosk needs cleaning or is clean and ready for the next patron. Alternatively, the proximity sensor system can self-detect if a patron is playing or not and trigger the cleaning event which will change the state of the clean sensor/indicator light. An audio sensor can also be used on the clean sensor/indicator to detect terminal usage—the sensor can detect gameplay noises from a known library or the sound of user interface elements such as buttons being pressed. Game machines/self service kiosk can have physical based airspace separators to limit the transmission of coughs, sneezes and aerosols breathed out of patrons. The electronic indicator may be associated with the clean sensor/indicator. This will give the patron physical separation from others playing adjacent to them if desired. Physical partition may be fixed in place, moveable by the patron or employees and may have clean sensor/indicator incorporated into it or adjacent to it.

FIG. 8 shows shopping carts with the clean sensor/indicator affixed to the handle for customers and employees to know if the cart is clean. This sensor/indicator can apply to handheld basket shopping carts. These deployments may add motion sensors, touch sensors to aid in determining when the basket is not clean because a patron has used it in the location. This sensor data can be used to configure the timer/processor to change the indicator light status to RED or GREEN. As a cart is taken by a customer its status would change to indicate that it needs to be cleaned after use. This status would be driven by a motion sensor being triggered by the customer moving the cart, or other types of sensors. For example, if the sensor moves a particular distance away from a fixed radio, the attenuation of the received signal could cause the status to be changed to requiring cleaning after the customer returns the cart. Also, the device can have an optional network connectivity to let staff have a log of all cleaning events. The RED/GREEN indicator lights can aid customers deciding which shopping cart to use or not based upon cleanliness.

FIG. 8 shows that a kiosk, game or other terminal machines and area cameras can include thermal sensors and machine vision can be used to determine if a person's temperature is above a threshold and employees can be alerted to the area for cleaning, security purposes, and/or medical treatment.

Figure 8A:
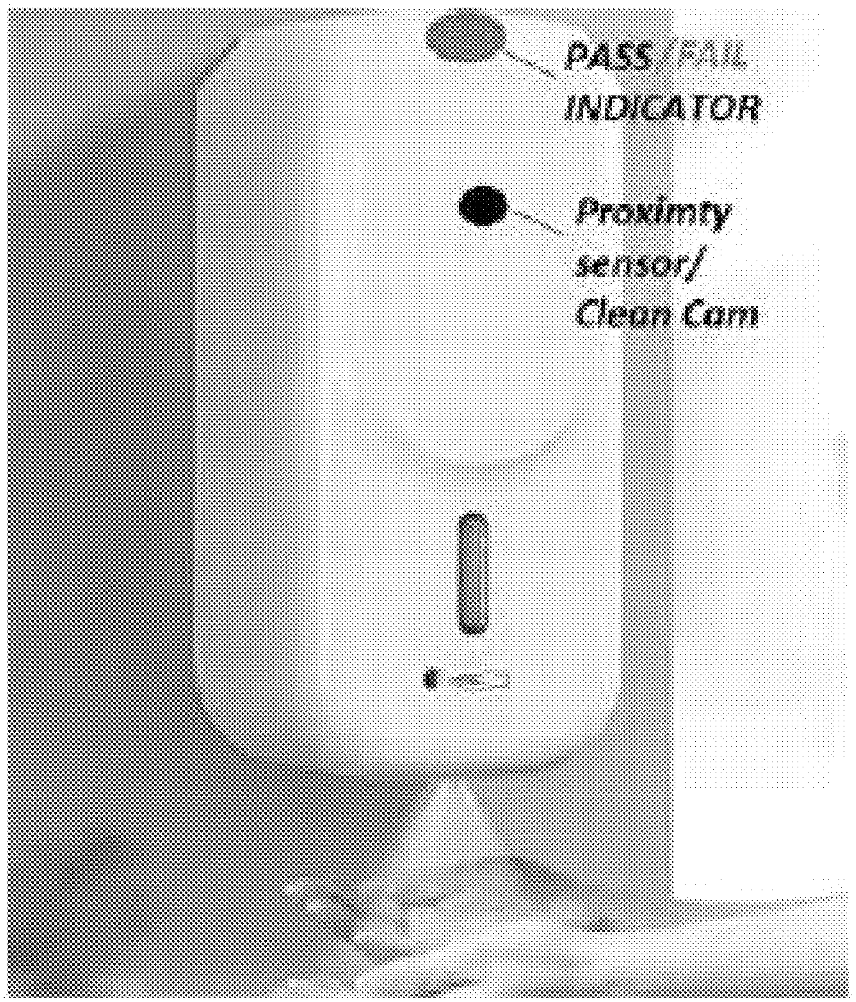
FIG. 8A is an image of a hand sanitizer dispenser that has an integrated clean sensor/indicator system.

FIG. 8A shows a hand sanitizer dispenser that has an integrated clean sensor/indicator. The device senses presence of a human being or parts of a human being like the hands. The indicator is RED. When the person dispenses the sanitizer onto their hands then a mechanical or electrical activator tells the clean sensor/indicator to change the indicator light to GREEN. This means that the person has done the required cleaning of hands prior to going to work or leaving work. If the sensor detects a person and determines that the person is trying to bypass the hand sanitization process, then then notifications are made to other staff that an unclean person is entering the facility or room. The sensor may employ a biometric camera or other sensor that uniquely identifies people and then compliance reports are made for the management for each entry of every employee. This sensor can optionally read something carried by the employee or consumer like a cell phone, RFID tag, NFC tag, BLE beacon. This technology ensures a compliant hand sanitization process or employees or patrons. The advantage over the prior art is that this dispenser with clean sensor indicator ensures that hands are clean prior to entering facility and that the sanitizer was actually put on the hands for each person. Machine vision or other sensors can watch for the proper application of the sanitizer or soap to the hands. This type of system can be linked to other systems in the facility to allow or disallow access to the facility. A non-limiting example is the access door may not unlock. This type of device can also be positioned on the entrance or exit to restrooms to aid in sanitary compliance for employees entering or leaving this space.

Figure 9:
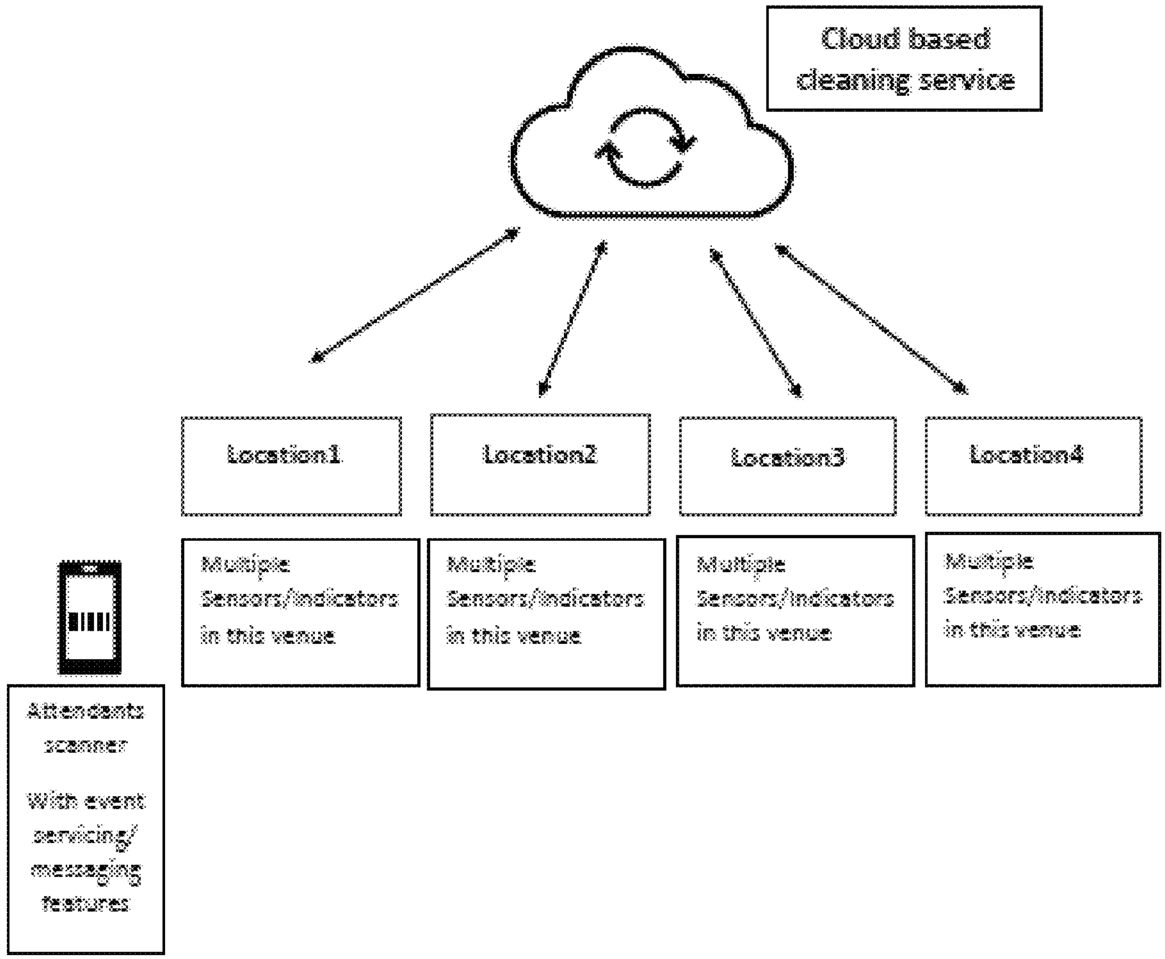
FIG. 9 is an exemplary network topology of a series of locations that each have multiple clean sensor/indicators across their various surfaces, wherein any one or combination of these clean sensor/indicators can have their transaction data sent to the cloud-based cleaning service.

FIG. 9 is an exemplary network topology of a cloud-based cleaning service system that links one or more properties/locations. Each of these properties can be different businesses in multiple industries or can be groups of locations owned and operated by the same enterprise. For example: 24-hour fitness chains or a hospital group. The cloud service is fully multi-tenant to host multiple businesses and home customers into the clean service eco-system. An clean sensor/indicator out in the edge location has a means of uploading its transactions to this system through employees manually uploading the data using a mobile handheld device or the clean sensor/indicator can have a network connection and directly connect the cleaning service system using wired or wireless connection to the internet and onto the cloud based service. AWS, GOOGLE or Microsoft AZURE are exemplary cloud infrastructure service providers to host a cloud based database cleaning service. For locations with clean camera sensors or existing surveillance cameras the cloud cleaning service can message the indicators/sensors at specific locations when key events occur as determined by machine vision/machine learning algorithms. In this way the sensor/indicators are updated automatically upon key business rules that that business customer establishes based upon its requirements or industry standards. These messages from the cleaning service can also be sent to individual employee's mobile phones to alert them which surface to clean or to clean a group of surfaces. Other displays in the employee break room or elsewhere can also indicate which surface needs to be cleaned. Such displays may be a tablet or digital signage that shows the specific tables or machines that need to be cleaned. Other key cleaning metrics for each location can be shown to managers and groups of employees to aid them in there cleaning compliance process.

Figure 10:
FIG. 10 shows exemplary embodiments of electronic clean sensor/indicator lights, one in GREEN mode and one in RED mode.
Figure 10:
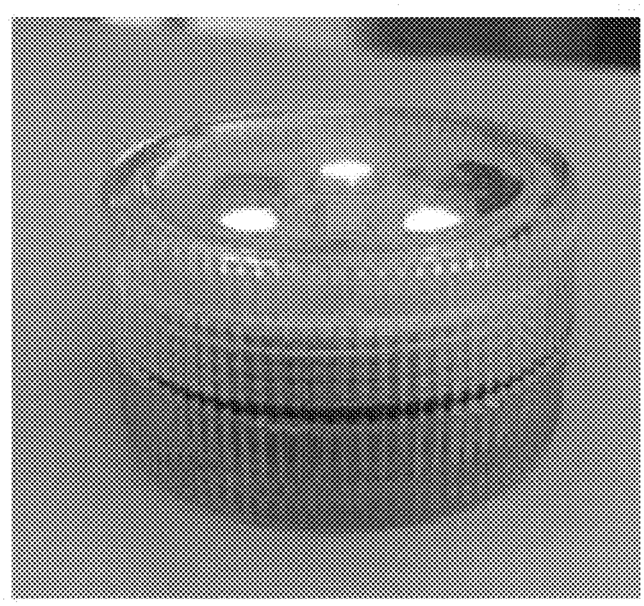

FIG. 10 shows two pictures of adhesive backed clean sensor/indicator electronic buttons that are affixed on a surface or adjacent to a surface to be regularly cleaned. They are approx. 1.25" diameter and approximately 0.75" tall. They have the electronics as discussed in FIG. 7. The ones depicted are dual CR2032 battery operated to allow months of usage in a location. They can alternatively be hard wire powered and networked with WIFI, Bluetooth, a mesh network, or Power over ethernet (POE). This image is just another embodiment of the type of packaging for the fluid proof sensor. LEDs inside the device can come in more than two colors for different modes of the device. For example, a Yellow LED light could be used to denote the surface is about to require cleaning. Other colors or flashing modes can warn of low battery, etc.

Figure 11:
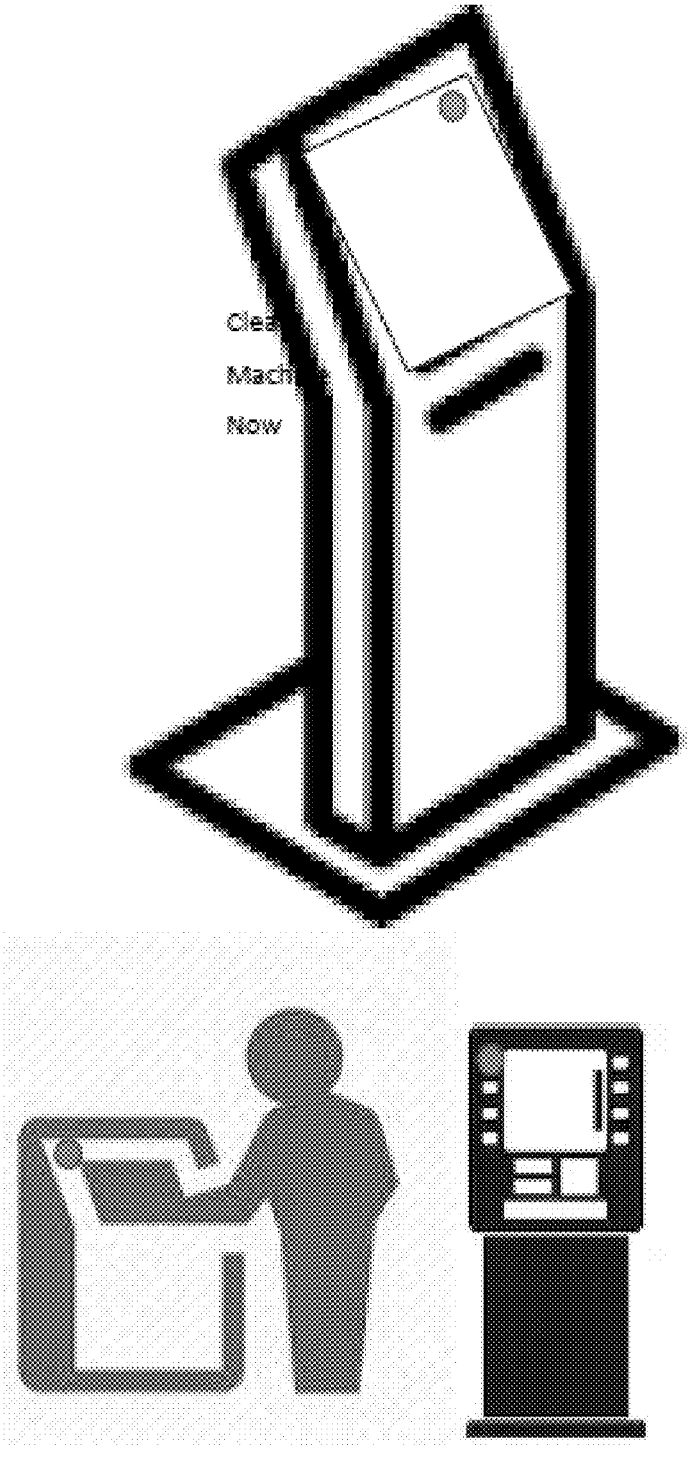
FIG. 11 shows exemplary deployments of SAFE & READY sensor/indicators embedded into original equipment manufacturer (OEM) supplied equipment.

Referring to FIG. 11, in alternate embodiments, the clean sensor/indicator functions can be embedded natively into any surface or device from any manufacturer. Non-limiting examples: a game machine, controllers linked to gaming machines, kiosks, appliances, kitchen surfaces, hospital equipment, tables, office cubicles, faucets, factory equipment, etc. could use its own display screen or a separate indicator light or other output indicator to notify people that the device needs to be cleaned. Sensor/indicator cleaning rules can be set uniquely for that device or surface based upon time, device/surface utilization count, humans in proximity to device/utilization, whether the device/surface has been touched, coughed on, sneezed on, etc. In one embodiment, the clean sensor/Indicator can enable automatic cleaning for the surface by turning on a UV-C light source to be turned on near the device for a period of time. This UV-C light may be enabled when no-human is in proximity to the machine for safety. The devices/surfaces that have this technology embedded into them can also send alerts to systems in the premises or in the cloud that will notify service attendants that the devices need cleaning. Human touch sensors may be incorporated into the surface or device to sense if the device has been touched at all and a log of the touches that have occurred is created. Other sensors to detect human contact include but are not limited to are: cameras, proximity sensors, light sensors, audio sensors, speech sensors, LIDAR sensors, depth sensors, PIR sensors, fluid sensors, capacitive sensors, motion sensors, tilt sensors, gyroscopes, hall effect sensors, ultrasonic sensors, radar sensors, thermal sensors, Bluetooth sensors, EMI sensors, electronic ID badges or emitters, flex sensors to sense flex in the surface/device, weight sensors, vibration, accelerometers etc. Any sensor that can be interfaced to the surface or device that determine utilization of that surface or location is contemplated by this invention.

External sensors and systems connect to the surface/device can detect utilization of it and send commands to the device to display an indicator to the consumer and employees that it needs to be cleaned. A remote camera running machine vision is a non-limiting example of a remote sensor.

Software APIs (application programing interfaces) can be provided to product designers to incorporate the clean indicator system into their products. These APIs can also receive the sensors and their associated data into an integrated cleaning eco-system. A non-limiting example would be when a retailer uses thermal temperature scans of humans entering the facility this data can be sent up to a clean surface eco-system and potentially combined with the biometric system that scanned the individuals face and face ID. Environmental sensors like temperature, humidity, human thermometers, occupancy sensors, proximity sensors, security camera systems, RFID systems, customer tracking systems, airflow sensors, HVAC system data, other handheld devices with sensors, can be combined into the clean surface eco-system. Business rule configurators can make complex business rules that can trigger the cleaning events and indicators to change status. Thus, a whole eco-system of devices/surfaces around the world can be incorporated into the cleaning compliance system. This data can be sent to government, industry, regulatory, and health officials to aid in their "big data" efforts to understand how all the locations are complying with cleaning processes. Organizations like the Global Biorisk Advisory Council (GBAC) are a division of ISSA, the worldwide cleaning industry association may certify these SAFE & READY sensor/indicator systems.

SAFE & READY sensor/indicators may optionally be affixed to the side of various electronic devices like game machines/kiosks, POS stations, interactive digital signage, machines, and other surfaces. This can be on a placard that shows the patrons at this device that the surface is in need of cleaning or has recently been cleaned.

Figure 11A:
FIG. 11A shows a depiction of a cleaning mop with a clean sensor/indicator attached thereto.

FIG. 11A shows a cleaning instrument with an integrated clean sensor/indicator. This IOT connected device can track the movement (using accelerometers) of the broom to ensure cleaning, it can log duration of the cleaning, it can optionally track the location of the mop in the facility using technologies such as indoor positioning systems (which themselves may be built from a combination of sensor fusion, radio triangulation or other technologies). The indicator can change color when the cleaning is complete. It can send this information to the centralized cleaning database for full audit trail reporting. In alternative embodiments, any cleaning instrument used by cleaning personnel can have these clean sensor/indicators attached to or integrated with it. Brooms, mops, dusters, rags, cleaning fluid, mop buckets, containers, cleaning machines, window washers squeegee, vacuums, floor polishers, sponges, cleaning gloves, toilet cleaner tools, dustpans are non-limiting examples. These IOT devices can receive location data from Bluetooth, WIFI, RFID, GPS or other indoor asset tracking sensors.

Figure 12:
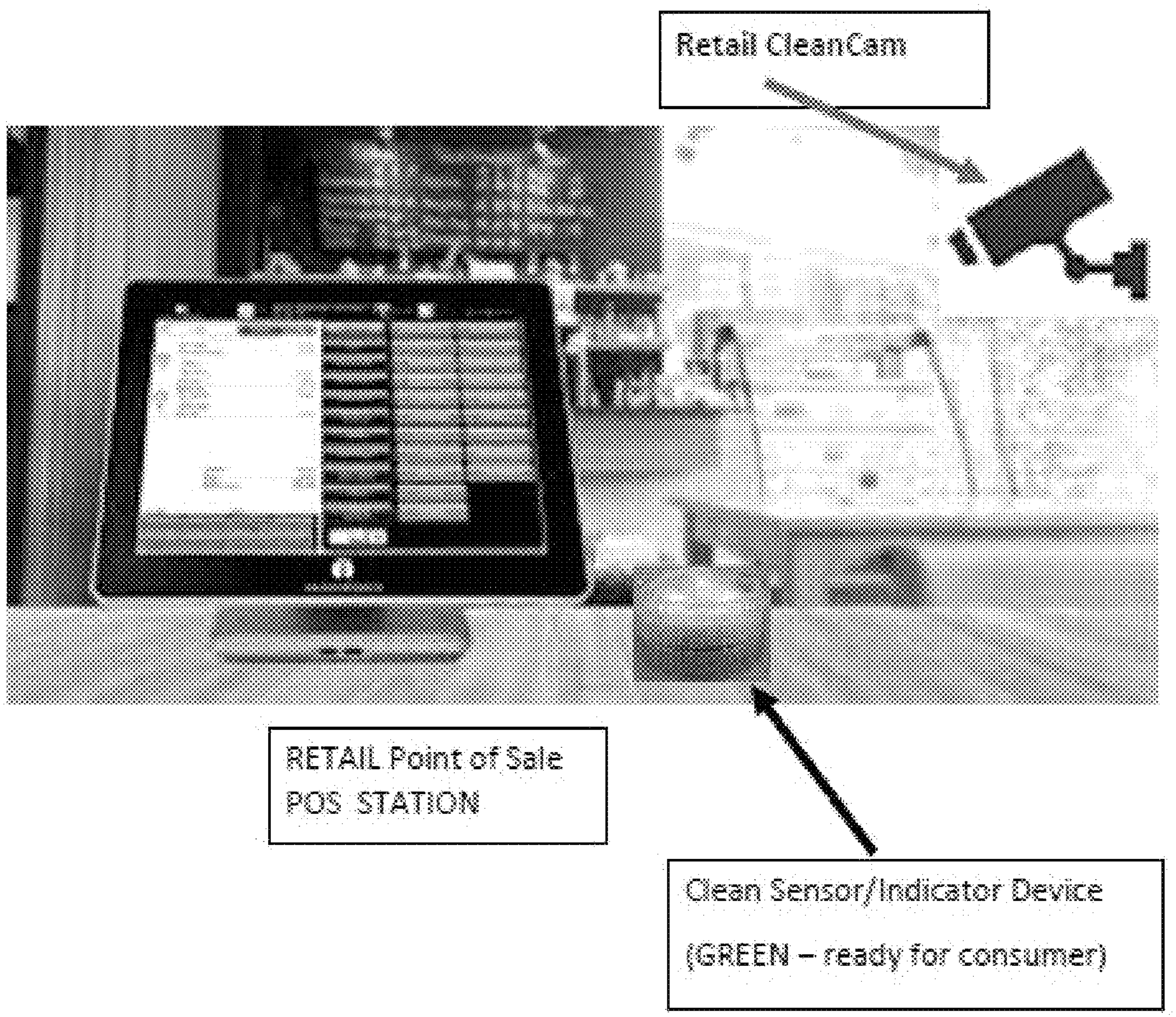
FIG. 12 shows a retail establishment with an exemplary SAFE & READY sensor/indicator and an exemplary clean camera system.

FIG. 12 is an image of a retail location with a point of sale (POS) terminal. On the surface next to the terminal is a SAFE & READY sensor/indicator. It denotes that the counter was recently cleaned and is ready for customers to utilize. The indicator also tells the staff when it should be cleaned. This is typically indicated when the LED is RED. The retail establishment also has cameras that observe the retail establishment. The cameras can be existing surveillance cameras that are used for security purposes or can be newly installed AI clean cameras. The camera and/or associated systems implements machine vision/deep learning that can observe patrons/customers behaviors using and touching the equipment or surface. It also observes cleaning actions by employees or automated cleaning systems. Based upon predefined cleaning business rules established by the retail establishment, regulatory bodies, or trade associations the AI clean camera system can trigger the SAFE & READY sensor/indicator light to change color to RED denoting that the surrounding surfaces need to be cleaned.

Figure 13:
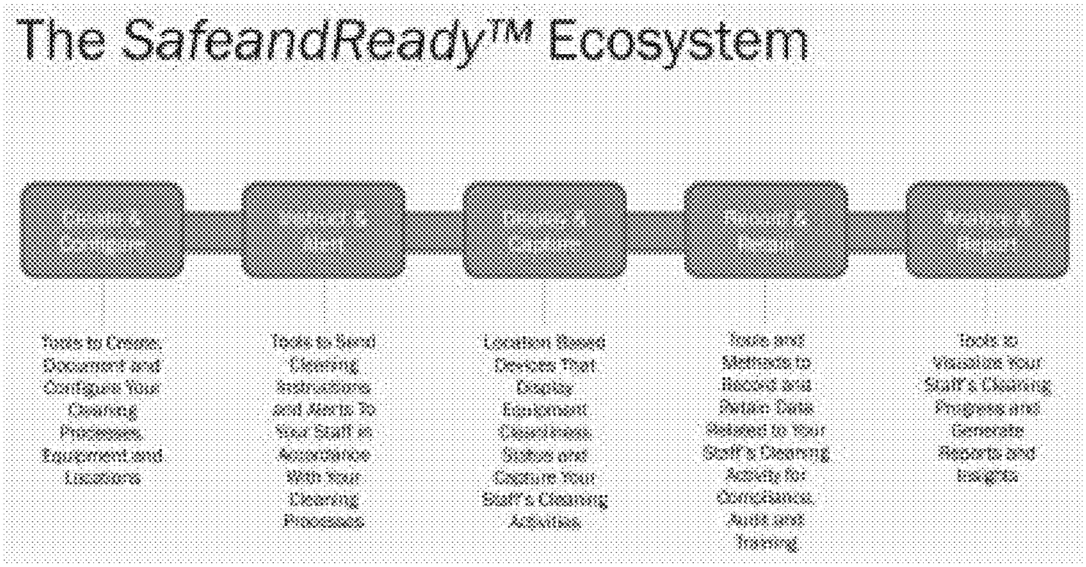
FIG. 13 shows an exemplary cleaning compliance ecosystem that is associated with the end to end creation and management of a SAFE & READY sensor/indicator system.

FIG. 13 is an exemplary cleaning compliance eco-system. The "create & configure" box describes an ability for a customer to leverage web and mobile tools to create, document and configure the cleaning processes and all the locations and equipment in their various locations. This is where they can assign all surfaces that they want to track the cleaning activity to a unique ID. This unique ID will allow them to keep an audit trail and run analytics and predictive analytics for their organization. Location and equipment visualizers can be used. Import and upload capabilities can be provided for businesses to import the property floor/equipment/camera layouts. All surfaces and equipment in these locations can be assigned the unique ID for cleaning. Next, the "instruct & alert" box indicates that they are provided tools and interfaces to send cleaning instructions and alerts to staff in accordance with desired cleaning processes. For example, the business may decide that every time a customer touches or interacts in any way with the surface that they want a human attendant to be alerted to clean that specific surface. Alternatively, the clean rule may be to clean the surface every two hours. A rules engine, alerts, notification engine, electronic dispatch, printed or electronic instructions are provided. Next the DISPLAY AND CAPTURE box shows that indicators in the retail or commercial establishment are updated to indicate that cleaning is needed. These indicators can be direct to the employee's handheld device, digital signage, or other employee facing terminal displays. Both the employee or a group of employees may be alerted to do the cleaning. In addition, the SAFE & READY sensor/indicator may be changed to the RED color through a server-based message to the device. This closed loop feedback system may be very useful in optimizing labor utilization and providing a call to action for employees and an indication for customers for which surface or area is clean or not clean. This can be a huge value for consumers. Next, the "record & retain" box discusses the tools and methods to record and retain the data related to the staffs cleaning activity for compliance, audit, and training purposes. Enterprises want business analytics and reports to ensure they are operating in a correct way and where and when there may be problems. These bid data analytics can help them drive operational excellence. The data can reside on-premises or data can be stored in at cloud infrastructure providers and even at hybrid cloud models. The "analyze & report" box shows tools to visualize staffs' cleaning progress and generate reports and insights. These visualization tools can include cleanliness dashboard and metrics, property visualizer, machine leaning AI models to aid companies to predict and manage future cleaning needs.

Figure 14:
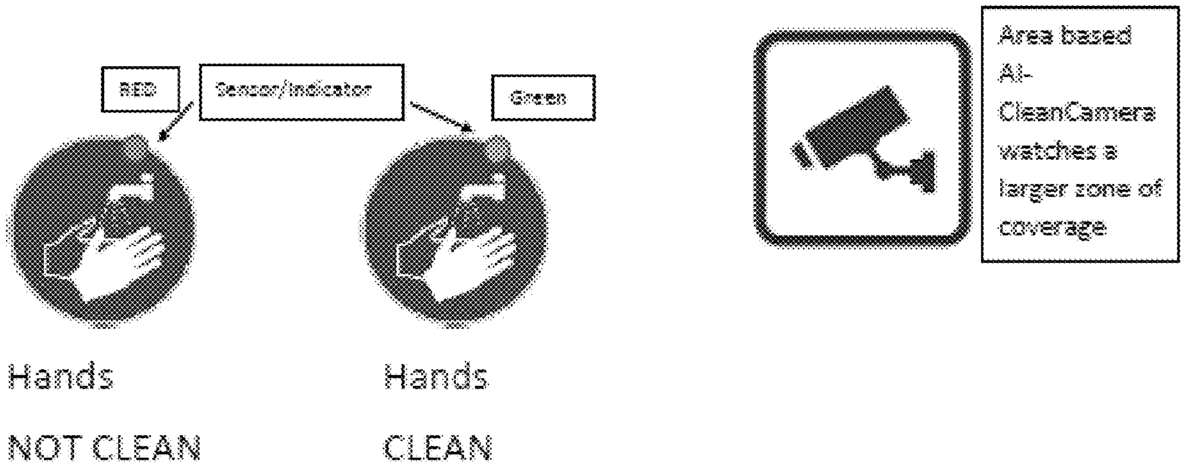
FIG. 14 shows a depiction of an exemplary SAFE & READY sensor/indicator system being used with a hand washing station.

FIG. 14 shows a depiction of clean sensor/indicator located in proximity to a wash station or sink, or sanitizer dispenser. Disease prevention experts have guidelines on the safe hand cleaning process and it usually says to scrub hands for 20 seconds at a minimum with soap. These clean sensor/indicators employ various sensors described in this invention document. Machine vision AI cameras, motion sensors, thermal sensors, proximity sensors, fluid sensors, microphones that monitor fluid flow can be used to determine if the cleaning guidelines are implemented by the employee and optionally the customers of the location. Indication lights/displays/sounds are given to alert the person when he/she has done enough washing and can leave. This invention describes a clean sensor/indicator system that will give the person the feedback that they need. In some use cases, a biometric system can identify the user prior to, during, or after washing. Then, the washing procedure is linked in the database to this individual on a personal basis. Analytics for employees and management will be created to ensure compliance rules. Other means of identifying the employee or customer can include cell phone tracking, employee ID card tracking, or another device carried by employee. Machine vision/deep learning or other sensors can sense the actual hands rubbing together, determine if soap was used, determine wash time, determine quality of cleaning the hands (were all surfaces cleaned properly). Area based cameras can determine if a person left the bathroom, a bathroom stall or urinal area and did or did not wash their hands prior to leaving. Area cameras would be positioned to ensure privacy of the individual. Other technologies could be employed—for example audio sensors could detect a stall being opened and no corresponding sound of a faucet being activated for a long enough period of time. Alternatively, users may be issued with a tag such as an RFID wristband or employee badge or application loaded onto their mobile device that can be located within the restroom using indoor positioning technology. If the tag does not dwell near to the cleaning area for a minimum amount of time, it can indicate that the user did not use the hand washing equipment enough or at all. Indicator lights, messages can be shown in proximity to the entry/exit of the washroom. The invention is to ensure that employees and optionally patrons clean their hands prior to returning to the establishment. This technology can be helpful for businesses, retail establishments, hospitals, and other facilities that have washrooms. Viruses and bacteria can easily transfer from one person to another after using the bathroom. Often this is because fecal matter often exists on hands without washing. In one embodiment a UVC lamp is turned on above the wash station during the hand washing process for this person. This would aid in the decontamination of the hands. So the SAFE & READY sensor/indicator can include Ultraviolet C (UVC) lights as an extra means to sanitize the hands. This same type of sensor can be positioned in toilet stalls to let cleaning crews know the stalls have been used or not by leveraging the clean sensor/indicator. Systems can be configured to trigger cleaning events to specific sink zone/toilets/urinals based upon utilization. The clean sensor/indicator can be natively integrated into the sink/faucet/toilet or surrounding area structures.

The clean sensor/indicator can be at key points to let a group of people know that a person is entering or leaving that is not been determined to be clean. A non-limiting example is anyone entering a retail business must use hand sanitizer before entering. Sensor/indicator systems can determine this and patrons and employees would be warned so corrective action can occur. Conversely, this person can be tracked by signs emitted from their personal consumer device or through machine vision, biometrics, person tracking to identify locations in the property that they have gone. Then cleaning events or personnel can be directed to that zone. Basically, a chain of trust for a person or object can be tracked with machine vision. Linking the human to locations and creating a risk profile and cleaning required event is contemplated by this invention. A non-clean/touched object can be tracked as it moves from one location to another and staff can be alerted as to the new location of the object so that it can be cleaned accordingly. Similarly, every surface that is touched by a person could be logged. Machine vision and deep learning can be trained to track and follow these events just as if an employee was sitting there watching the specific event or events happening.

Employees leaving break rooms/areas or entering their business can be tracked and notified that they need to clean their hands or put on protective equipment before they return to work. Clean sensor/indicators can be used to give immediate feedback to them prior to entering or leaving the space. As employees leave the work at the end of their shift the machine vision system can sense and indicate to the employees that they need to remove and dispose of their protective equipment/clothing and sanitize their hands. All these processes that be identified by the system and audit compliance logs are tracked per employee. It is very important that employees leave the workspace with cleanliness in mind.

A company called Teal at URL www.tealwash.com has portable hand washing sinks called Hygenius MediWash that have a multimedia display that guides people in their hand washing for the proper time and approach. They have hand sensors to turn on/off the water. The invention disclosed herein provides for clean/sensor indicators associated with a wash station that confirm the cleaning is done properly with hand sensors, cameras with machine vision to prove the person washed his hands in the proper way and for the proper amount of time. Indicator lights or display let the person know they completed it properly. Speakers can also indicate when the process is done properly or to guide the person to do the cleaning correctly.

Figure 15:
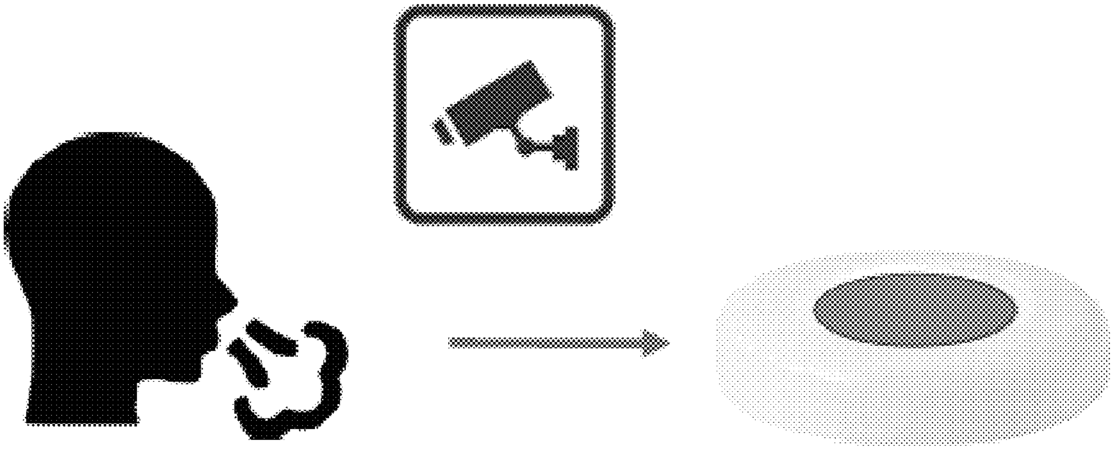
FIG. 15 shows a depiction of an exemplary SAFE & READY sensor/indicator system configured for detecting coughs/sneezes and hand touching that trigger clean events.

FIG. 15 shows a depiction of a cameras configured for detecting if humans cough, sneeze, touch their mouth or nose or face. It can also detect if a person touches a single surface/device or multiple surfaces/devices. Then the clean sensor/indicator light can be turned on so that staff can clean the surface proactively. Computer vision images can be sent to a neural network model that has been trained to recognize these human events and then the clean event is triggered. Area based cameras can watch many surfaces and can trigger clean alerts for specific sensor/indicators that need to be cleaned and not turn on others that do not need to be cleaned. One of the benefits cab be labor optimization for cleaning staff or employees.

These coughing, sneezing, face touching, surface touching events would be logged into servers that would provide detail auditing and reports. In other deployments, each machine or surface being monitored can have a camera focusing directly on this specific surface. The camera and indicator can be in the same electronic package or can be separate devices that can communicate to each other. These clean cameras can also send alerts to staff to investigate the people with a health checkup questionnaire, temperature read and other means to validate they are not sick and potentially spreading disease.

Figure 16:
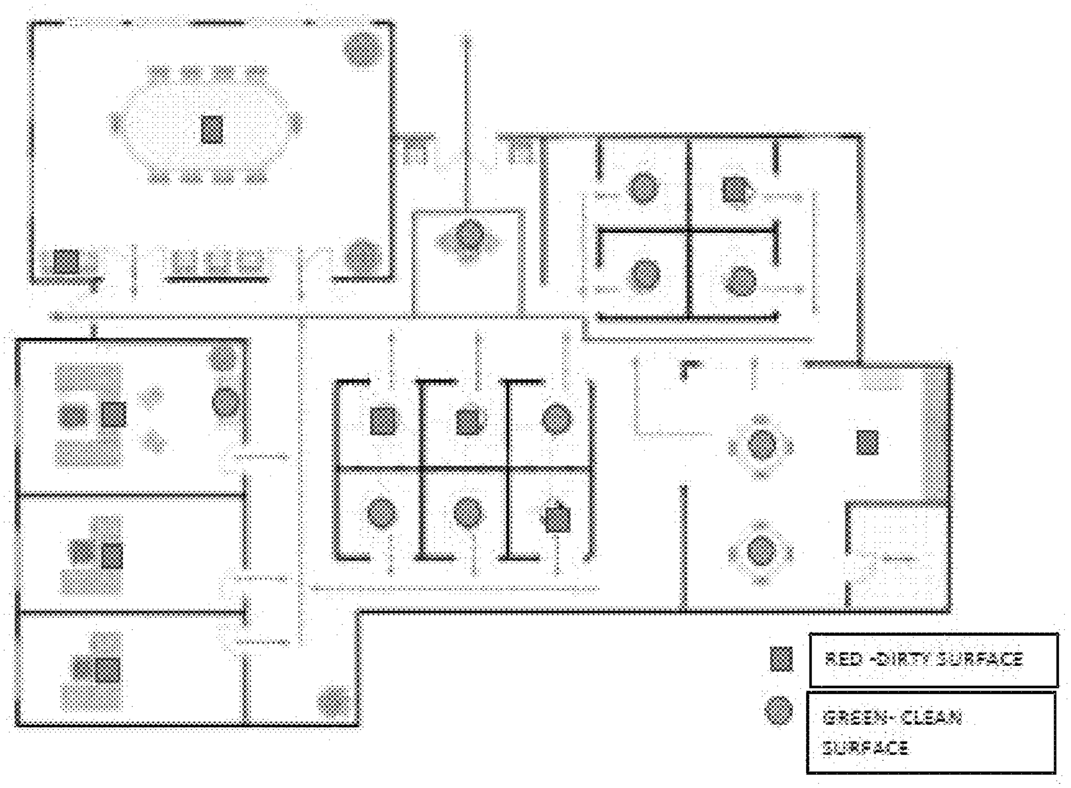
FIG. 16 shows a top down map of an office space, wherein an embodiment of the system is used to provide a clean sensor/indicator status for each monitored surface.

FIG. 16 is a figure that shows a typical deployment of SAFE & READY senor/indicators in an office space. Several desks and rooms are noted as clean and others are noted as unclean. Cleaning personnel can use tools like this to determine which surface/room to clean next. This example is representative of any location like a restaurant or retail establishment any other type location outlined in this disclosure. This image can be 2D or 3D in nature. Management is able to see time elapsed views of cleaning activity and responsiveness of employees assigned to do the cleaning. Often third party firms are hired by businesses to clean their facilities during or after business hours. The technology described in this disclosure can give an audit of how well they did their job cleaning.

Figure 17:
FIG. 17 shows a cleaning crew cleaning a room, wherein machine vision can be used for detecting the cleaning and surfaces.

FIG. 17 is an image of a cleaning crew cleaning a room. The machine vision camera and system are identifying that cleaning is occurring on specific surfaces. Gloves and rags are detected by machine vision techniques. The movement of the person's hands cleaning the surface is monitored. The clean sensor/indicator light is green denoting that the surface is now clean. Mops, cleaning buckets, brooms, can be detected and their associated movement and area coverage. Each surface has a surface ID associated with it. Cleaning crews' faces can be biometrically identified, and the cleaning event can be logged with their name and face ID and the time the cleaning was done. The face ID can link to a specific person with a registered name or can be a fully anonymous person doing the cleaning. Cleaning personnel clothing or equipment can also be detected by the machine vision and deep leaning, and this can be used to log cleaning events per surface cleaned. In either case, the central database keeps a log of the face ID or other unique identifier of the cleaning crew. Cleaning crews can be sent to specific locations that need to be cleaned after the machine vision determines that the surface or surfaces need to be cleaned based upon what it sees. For example: a spill of something on or an unauthorized object on a floor, a person touching or interfacing with a surface or device, a cough or sneeze or another event can cause this clean event to trigger. The presence of a pet or animal can trigger a cleaning event. The clean process below describes the key steps in detection of an unclean surface, cleaning event occurrence, and notification to customers and employees.

Overall Clean process includes:

1. An input to detect a surface becoming clean.
2. An input to detect a surface becoming unclean.
3. An indicator to indicate the surface is CLEAN or UNCLEAN.

Inputs to detect a surface becoming clean.

- Local site Machine Vision (focused on one surface or set of surfaces). This would be an edge IOT machine vision device.
- Looking for employee cleaning gloves.
  - Detect gloves using Tensorflow object detection SSD (single shot detector) or other object detection models such as YOLO.
  - Detect gloves using image or instance segmentation such as Mask-RCNN.
- Looking for special identifying wristbands on employees that customers would not have.
  - Detect wristbands with ssd/segmentation, or object detection SSD.
- Looking for rags or other washing instruments used by cleaning attendant.
  - As for gloves.
- Looking for cleaning bottles used by employees.
- Looking for cleaning staff using facial biometrics.
- Looking for cleaning tool belts or cleaning personnel clothing to identify an employee cleaner.
- Looking for fluids being sprayed on a surface.
- Looking for the amount of surface that a cleaning rag has wiped down a particular surface.
- Measuring the time that specific surface has been cleaned by employee.
- Looking for cleaning attendant ID/badge and name and number using machine vision.
- Looking for several cleaning indicators that when combined create a high confidence that this is a clean event for that surface verses a normal user interfacing or being adjacent to the surface. A non-limiting example would be the machine vision detecting the gloved hand with a wipe down rag and a cleaning bottle in the other hand of the attendant to indicate that this is a cleaning person. A customer may have both of his/her hands gloved but there is no rag in the hand. Also, the machine vision will determine the difference between a napkin wiping the surface for the patron and a cleaning rag of a cleaning attendant. It is contemplated by this invention that any combination of items or movements of patrons or employees can be used to determine if this is a cleaning event or not. Employee uniform detection is also an indicator that this is a cleaning person verses a customer or non-cleaning employee.

Area based machine vision.

- This can be done when a physical location is mapped out with cameras and a facility map.
- The machine vision can look for the same or similar type of objects or events as described above for the local machine vision.
- At setup/configuration, each surface/device that needs to be cleaned is marked with rectangles or polygons within the camera video feed to assign unique IDs to surfaces/objects. This marking may be done automatically by the use of another object detection or segmentation mask system which detects surfaces or equipment to be cleaned and marks them accordingly for later use within the camera feed. For example, a deep learning system may be trained to take an input from a camera image and generate a segmentation mask for a piece of exercise equipment in a gym. This mask can then be used as an input into the real-time machine vision system which can track if cleaning events are taking place at the equipment, or usage is taking place requiring a cleaning. In addition, or alternatively, a facilities person for that business can denote surfaces he/she cares to monitor in their property. From this point forward the machine vision/deep-learning algorithms can be used to track which of these surfaces in the cameras field of view have had customers and employees interact with those surfaces.
- Optionally, the facilities attendant can use LIDAR based cameras or 3D sensing cameras to map the facility in 3D space (creating a point cloud) creating a 3D Map of all surfaces in a particular location. A location can then load their existing 2D top down floor plan into the system and transform it into camera/LIDAR space for surfaces to be tracked.

Using Machine Vision (Proof of cleaning and completeness of cleaning).

Figure 26:
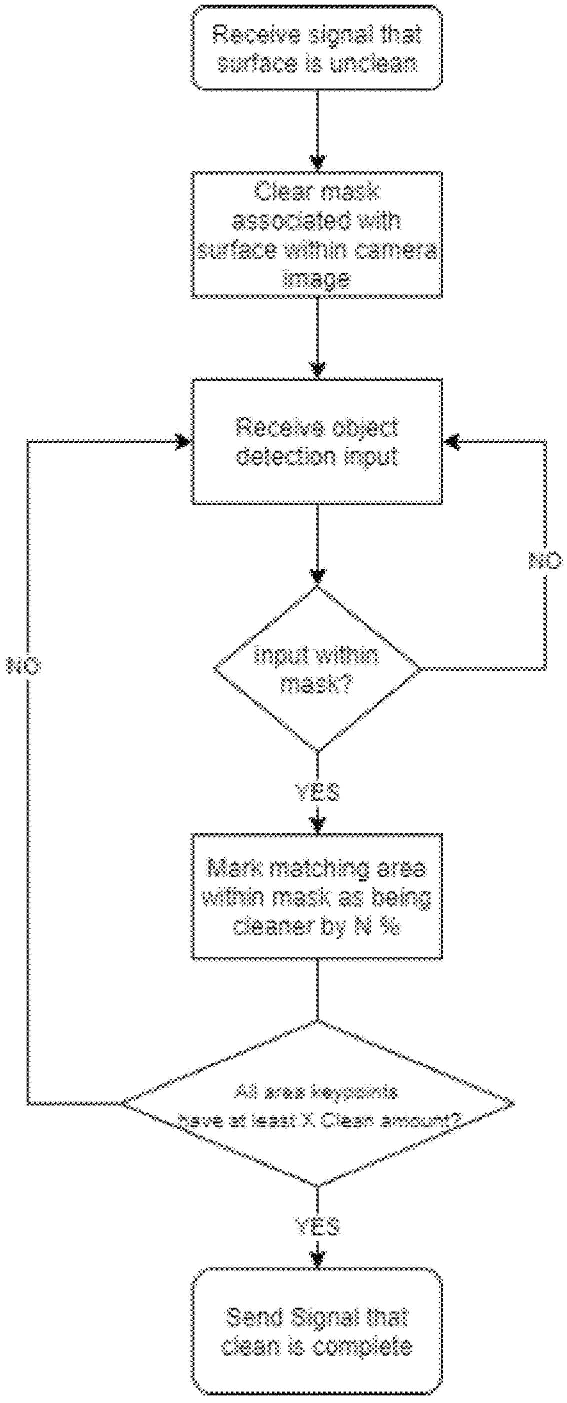
FIG. 26 shows a flowchart of an exemplary machine vision process.

- Machine vision can detect movement of gloves/rags/wristbands/cleaning materials/or cleaning personnel. It can use Tensorflow object detection coordinate boxes or image segmentation masks to "paint" the identified surfaces of the live camera image or overlay the 2D or 3D facilities map with indications of which surface is clean or not clean. This can be a heat map of the facility showing its current state of cleanliness, for example. This image can be relayed to a supervising employee or other system to be displayed remotely. In the image, areas where a cleaning item (such as a glove) had been present for a minimum amount of time would be transparently overlaid with a semi-transparent green tint, but other areas not yet meeting the clean standard can be overlaid with a semi-transparent red tint. Referring to FIG. 26, the area can be marked within the live image overlay by either the bounding box output from the object detection model, or the image segmentation mask from the current camera image. These areas can be cumulative—as each image is received, its current box or mask is computed and added to the composite overlay. Optionally, the addition may only contribute a smaller fraction than whole to the composition. So, a first pass with the cleaning equipment may only change the overlay in the sensed area from 100% red to 80% red-20% green, and further passes may be needed to complete the clean.

The system can be configured such that the surface would only pass as CLEAN if a set of points or a large percentage of the surface are covered by the employee at cleaning time.

The system can be configured such that the surface would only pass as CLEAN if cleaning time by the employee is larger than a preset amount.

The system can be configured such that the surface would only pass as CLEAN if percentage of the surface area cleaned is larger than a preset threshold amount.

Detecting moisture on a surface that is applied by a cleaning attendant.

A capacitance sensor can be tuned for a certain threshold limit so wet fingers can't trigger a WET state. The capacitance sensor can then be used as part of the sensing system.

Internally reflected light off a photo sensor/emitter can be used to determine when the surface is wet (as used on cars for windshield rain sensors).

A chemical that turns from opaque to transparent or dark to light to enable a photosensor to see the change can be used. This can be hydrochromic ink for example.

Heat sensitive (hot water/cleaner detection) sensors can be used.

Thermal imaging sensors that sense if an area is becoming warm or cool as it is cleaned can be used.

An array of sensors to detect % of surface coverage (same as machine vision rules) can be used.

A pH sensor to detect presence of soap (soap is alkaline) can be used.

Cameras can be used for sensing a spill, moisture or droplets by the use of an object detection or segmentation mask model.

Detecting cleaning person/cleaning material/cleaning supplies.

NFC pairing—NFC tag can be affixed to surface to be regularly cleaned and monitored.

A reader carried the employee can be used to read the NFC tag. The reader can be embodied as: a phone, a wristband, a separate unit on the person.

The NFC tag can alternately also be affixed to the cleaning personnel and the clean sensor/indicator device can read this NFC tag associated with this cleaning person. The SAFE & READY sensor/indicator can upload this transaction to a centralized cleaning service. This gives an audit capability of which employee cleaned which surface.

Microphone affixed on or near the surface to be cleaned can be used to detect audio of a person cleaning the surface. For instance, a stethoscope type sensor or vibration sensor connected to surface can be used to detect vibrations of the surface.

Photosensors can be used to detect a glove or a rag passing over the sensor attached to a surface. In one embodiment, the surface is not determined to be clean unless all sensors are passed over with cleaning instrument within a predetermined time period.

A Hall effect sensor can be attached to the surface, wherein a magnet is mounted in a glove, a wristband, a rag or a cleaning bottle. This magnet can be detected by sensor/indicator on surface and log the cleaning event.

A BLE (Bluetooth low energy) tag can be affixed to a surface being read by cleaning attendant mobile/wireless device. Same or similar methods described above for NFC can be used. Alternatively, a BLE beacon can be placed on the cleaning attendant and is read by a clean sensor/indicator IOT device.

BLE/NFC/Sensor fusion/WIFI can be used to detect location/positioning of an employee. An internal measurement unit (IMU) can be used to track glove, rag, cleaning person, cleaning supplies or cleaning cart around whole venue. Area vision can be used to localize the tracked objects, and then the IMU can be used for dead reckoning within localized area. Area vision can involve the use of LIDAR, RADAR, or other ways of positioning the employee.

IR, Radar, or other motion sensing can be used to detect whether the time of cleaning motion is greater than a predetermined amount. This can involve use of multiple sensors affixed to the surface. In some embodiments, all sensors must be triggered to trigger CLEAN surface indicator.

Sensor fusion can combine multiple sensors to validate and trigger a cleaning event and those sensors can be combined to determining if cleaning personnel and equipment have cleaned the surface. Use of multiple sensors in such a combination can create an improved and more accurate triggering event.

Cleaning attendant confirmation they cleaned the surface (manual confirmation).

The system can include a manual press button with the clean sensor/indicator to allow a cleaning attendant to indicate that they cleaned the area. This button may be protected to prevent customer access. A button on the cleaning attendant can alternatively be pressed in which a signal is wirelessly sent to a nearest clean sensor/indicator to close the transaction.

In some embodiments, a cleaning attendant can cover a photosensor on a clean sensor/indicator to close the transaction.

In some embodiments, a cleaning attendant can make a voice command ("Table 20 clean") that their mobile/wireless device hears, or the clean sensor/indicator can hear to close the transaction.

In some embodiments, a cleaning attendant can enter data on phone or other data entry device to close the transaction.

In some embodiments, a cleaning attendant can scan a barcode on the clean sensor/indicator to close the transaction.

In some embodiments, a cleaning attendant can use an IR remote to reset the clean sensor/indicator to close the transaction.

In some embodiments, a remote employee override/signal can be sent from centralized operator console to change the state the employee designated the surface to be.

1D, 2D or 3D barcode on a clean sensor/indicator can be used so that when it is scanned by an employee carried device, the device uploads the barcode, time, and employee ID that did the cleaning to a cloud cleaning system.

Alternatively, the employee can carry the barcode and it can be scanned by the clean sensor/indicator. The employee ID barcode, the time, and the unique ID of the clean and ready sensor/indicator can then uploaded to a cloud cleaning system.

Inputs to detect a surface becoming unclean.

Timers can be used to cause the system to designate a surface as unclean after a predetermined amount of time elapsed. Use local humidity, temperature, amount of light, etc. can also be used as factors in determining the predetermine time period. Use surface type (e.g. stainless steel is quicker to be declared) can also be used as factors in determined the predetermined time period. Other factors can include: number of people nearby—more means quicker declaration of needs cleaning; ambient noise—noisier means quicker.

Audio sensors as well as high speed heat sensitive video can be sued to detect coughing/sneezing sounds, presence of humans or robot, etc. Other sensors such as TOF (time of flight) sensors, Radar sensors, LIDAR sensors, presence of mobile radios (also Bluetooth or WIFI signals), heat sensitive imaging—detect people with a fever, etc. can be used.

Machine vision can be used for person or cleaning robot detection via SSD or segmentation. Human skeleton detection, head tracking, hand detection with no cleaning glove present can also be done. For instance, the machine vision can be used to look for anything associated with a human—e.g. a purse, car keys—so as to identify it as a person.

Audio sensors can be used to detect people talking nearby, sounds of eating, exercise etc.

Sensor can be sued to detect presence of things, such as a tray, knife, cup, fork, food, phones, other computing devices, etc. User can install apps on their phone with location broadcast to leverage the machine vision. Sniff WIFI network (provided for customers) can be used for triangulation.

Sensors can be used to detect operation and movement of equipment, noise coming from the equipment (e.g., exercise equipment), etc. This can include audio from video game (e.g. at Dave and Busters for example), signals from exercise equipment (e.g. RF signature on power line), power usage, video gaming machine play (e.g., credit tracking on card reader), motion of equipment (e.g. shopping cart being moved), mercury switches or other motion sense, whether equipment is docked against something else (e.g. another shopping cart), if docking ends (leaf switch opens=>equipment has moved), etc.

Moisture sensors can be used to detect moister content and amounts. In some embodiments, a predetermined amount of moister is required to be detected before it is classified as a cleaning event. Moister sensors can also determine the method used for the cleaning.

Sensors can be used to detect touches on surface. Theses can include machine vision detection of a hand or person proximity to surfaces, capacitance changes, Radar, LIDAR, stethoscope, etc. A trigger event can be generated if the level of touching is greater or less than a predetermined amount, if the noise fits a profile (e.g., sound of glass being placed on surface), etc.

The system can also utilize customer input signals regarding a clean or dirty state of the surface. This can be via a manual press button, hovering a finger over photo-sensor or pro-cap (non-touch), voice command, gesture (e.g. wave hand), sending a command from phone app, etc. The same or similar user input can be used for staff.

Indication of Surface is CLEAN or UNCLEAN.

In some embodiments, a display or indicator can be positioned at or near to surface to be cleaned. LED lights can be used for status indicators—e.g., RED for unclean, GREEN for clean. Other colors for different status—e.g. yellow if timed out. Flashing LEDs can be used to save battery life and draw attention to LED status. The LED may be off or different color when presence detected (e.g. someone using equipment). The system can be configured for coordination of surface statuses in proximity to each other in a zone—e.g., if one surface is unclean, then so are nearby ones based upon business rules. Some events (e.g. coughing or fever detected) can mark bigger area of surfaces as unclean. The clean sensor/indicator can use solar cells to recharge themselves and allow indicator to still show status even when power is out in the facility. Some embodiments can include battery backup for key transaction logs. LCD, OLED, or other displays can be used to shows the CLEAN or UNCLEAN statuses. E-ink can be used for saving power. Mechanical indicators can be used to actuate and show CLEAN or UNCLEAN status.

Some embodiments can use digital signage or other displays in the facility. These can be displays remote to surfaces that are being cleaned. The operator view can include: list of surfaces requiring cleaning; schedule of surfaces to be dispatched; utilization data derived from usage; heat map of patrons (occupancy sensor); map of surfaces requiring cleaning; estimates of cleaning products needed; indications when sanitizers are low (based on usage patterns); garbage bin tracking—sensing when bins need to be emptied; performance data on cleaning personnel—e.g. average clean time, quality and quantity metrics; reports for government agencies for compliance; etc. The cleaner view (can be via smartphone, smart wristband, smart watch, vibrating tag, etc.) can include: current list of surfaces to be cleaned; display on phone or augmented reality glasses; display on smart watch; notification if surface cleaning is too short or too long or correct amount; etc. A customer/patron view (allows customers to see how clean the property and its surfaces are, which includes current and historical data) can be via phone app or kiosk and can include map/list of cleaned tables/surfaces and ready for use and/or times of last clean.

Figure 18:
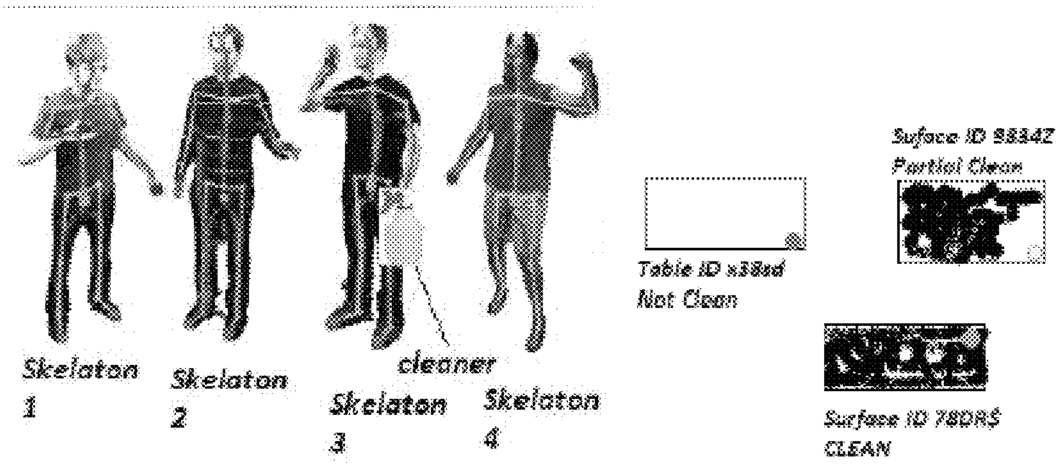
FIG. 18 shows machine vision techniques including human skeleton tracking and object recognition for detection of an employee.

FIG. 18 shows a depiction of multiple humans being seen by a camera and the skeleton tracking machine vision watching their head, torso, limbs and joints using a trained CNN neural network implementing human pose estimation. The machine vision is also detecting identifiers associated with cleaning personnel like cleaning gloves, wristbands, ID, ID lanyards, mops, brooms, tags, other cleaning instruments, cleaning bottles and cleaning rags and any other identifier that is used by cleaning personnel. Also, face detection techniques like MTCNN and AWS ReKognition or other biometrics can be used to identify cleaning personal. This technology can be used to identify which person is a cleaning person and which people are customers or non-cleaning personnel. Since each arm can be tracked real time, the cleaning personnel's work can be tracked on each surface in the cameras view. Thus, if an identified cleaning personnel wipes 75% of a surface with and ID #87Z342 then this can be logged in the central server and appropriate reports are created. This 75% cleaning threshold may not be enough of the surface cleaned to flag the surface as CLEAN in the system. These cleaning thresholds can be specific to each business and surface ID type for that location. A non-limiting example is that floors may need 65% coverage to determine that they are clean. Surfaces may be broken up into critical areas of cleaning and need a higher clean threshold than non-critical parts of that surface. These critical portions of a surface may more likely be in contact with humans than other portions for example, so those portions are not as critical. Cleaning crews may be given an electronic message or indicator may show that the surface meets the cleaning standard required and the crew can move to the next surface. The technology feedback system can help to enforce a quality cleaning process. The image on the right of FIG. 18 shows three different surfaces with various states of clean. One surface has not been cleaning, one surface has partial cleaning, and one surface is marked as clean. The cleaning employee's gloved hand is tracked as they did there wiping across the surface. Displays like this can be shown to the employee and managers to show the completeness of work for each employee for each cleaning. Video playback logs can be also shown for employee training and compliance purposes. Alternatively, the employees dwell time at each surface can be logged by the machine vision time. This can be an indicator of job performance as well. Tracking how long each employee is in the cleaning zone, how much of the surface they clean can be important to building a high quality of service for an organization.

Machine vision can track which surfaces and items in the room have been touched, coughed on, sneezed on or when people have gotten to close to those objects and then clean events can be triggered. A non-limiting example is in a hospital surgery room there is a section of the room that is called a "sterile field". Everything and person in that room must be clean. Any object or person that enters that sterile field must be clean as well. Alerts can be generates for hospital employees and patients that this "unsafe" condition has happened and should be remedied according to hospital rules. Machine vision/deep leaning can be trained to detect any specific object type or person type to track. Specific spatial zones around surfaces, people or objects can be setup these rules can be enforced by the Mmachine vision SAFE & READY clean system. The machine vision sensing may be complimented with other types of sensors in the space that can detect triggering events not limited to touch sensors, proximity, moisture and other types of sensors described in this document. These other sensors can provide extra confirmation to the machine vision that an event happened. A non-limiting example can be a capacitive touch sensor configured to sense when the item or surface is touched, and the machine vision configured to observe other events happening around that item or surface. The machine vision may not see the actual touch of the specific surface or device because of some obstruction in the field of view or the visual fidelity of the camera. Thus, these extra sensors can assist the machine vision to determine cleaning or must clean trigger events. Another example is a microphone in the room may pick up a cough our sneeze in the room and the associated processing of the audio signal may trigger the machine vision system to log which direction the human coughed or sneezed. Cleaning crews can be alerted and directed to the surface IDs that need to be cleaned. Indicators on those surfaces can turn RED or the cleaning crew can be sent messages or have wireless applications that show which surfaces need to be cleaned immediately. All of these events may also trigger environmental cleaning of the air with special UVC lighting, robots cleaning the area, liquid spray disinfectants being used, ventilation systems turned on, etc. Special air purifying systems may be turned on as well based upon these events. Organizations like hosptialinfection.org have created guidelines to help hospitals be safe from viral or bacteriological spread. National institute of Health NIH.GOV has guidelines for other businesses. Such guidelines can be used to generate business rules within the algorithm to determine when signals and alerts should be generated.

Figure 19:
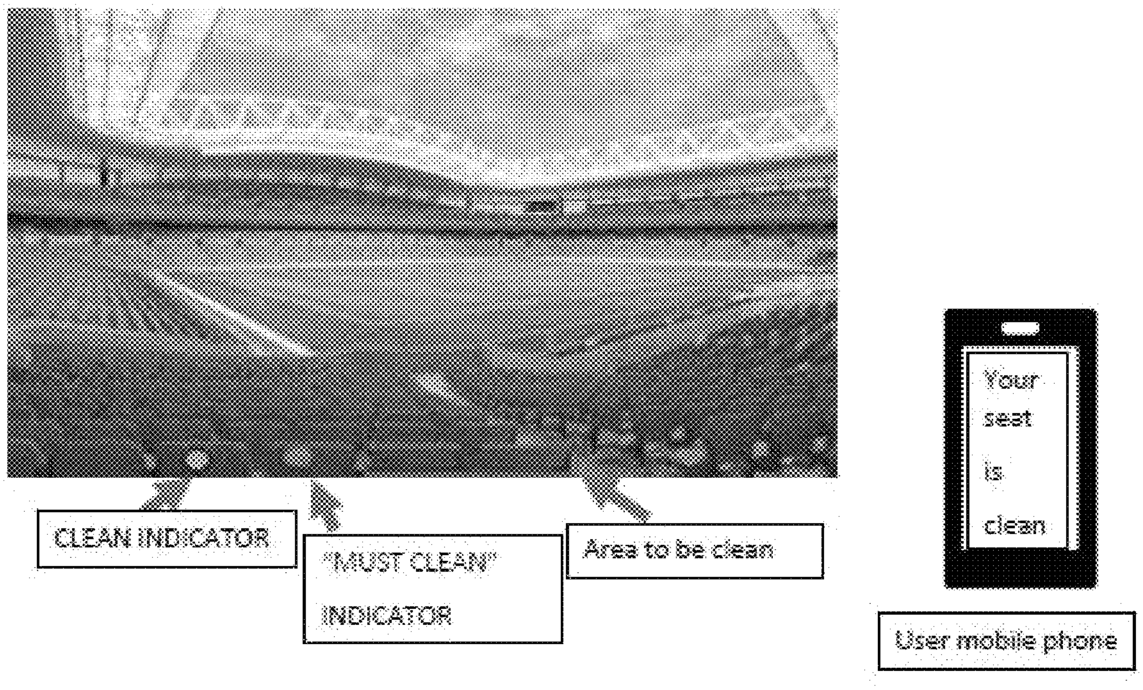
FIG. 19 shows a depiction of a sports stadium, wherein machine vision and/or other sensors/indicators providing clean or not clean indicators for seats.

FIG. 19 is a picture of a sports stadium that has machine vision observing whether seats/zones need to be cleaned. Deep leaning algorithms can track cleaning personal described in FIG. 18 and show which zones/seats are compliant with the stadium operational rules. One goal is to give customers of the event confidence that their seat is clean and ready for use. The patrons assigned to those seats may be messaged that their seat is clean prior or during the game event. This could occur with an indicator light at the seat (RED or GREEN) or sent to the user's mobile phone message or team/stadium mobile application. Management can have complete visualizations of the completeness of cleaning prior to the game by having a view of the entire stadium combined from multiple machine vision cameras watching every seat and concession stand, private boxes, bathrooms in the stadium. Full video logs of the cleaning events can be replayed at a later day for compliance and training reasons. This can lead to labor optimization and improvements to the quality of work. This type of large venue is representative of many types of venues like movie theaters, theatrical theaters, concert halls, etc. for which the system can be used for. Machine vision can watch for any type of event or events that combine to meet a cleaning business rule in the cleaning compliant system. Cleaning staff can then be alerted to that location to do the clean. This could occur even during the game event.

Stadiums may have face mask requirements for each patron and employee during the game. The machine vision system can monitor for the mask and if a mask is removed or not worn properly then staff can be alerted to that person for corrective action. Coughs, sneezes, surface or people touching, or other preconfigured "must clean" events can cause the clean staff or security or medical staff to the sent to the location. Human path tracking and density tracking can also be detected by sensors or the machine vision and can cause cleaning events to be triggered. Object tracking can be employed by the deep-learning machine vision system. These thresholds for cleaning can be preconfigured by zone, location, surface ID. Also, specific people or groups of people can be tracked with facial biometrics and areas that they come in contact with may cause triggering events that have employees sent to the area for cleaning, medical help, security purposes, etc.

Drones, robots and other moveable or fixed sensor systems can be used as part of the environmental cleaning eco-system. These systems can trigger cleaning events, and in some cases do the cleaning of the surface or airspace around the surfaces or zones that need to be cleaned. A non-limiting example is a drone can be sent to notify people of required behavior changes, spray a disinfectant, wash a surface, etc.

Figure 20:
FIG. 20 shows a depiction of a grocery store checkout stand and the machine vision detecting that employee to patron contact has occurred.

FIG. 20 is a picture of a grocery store checkout process with employee and customer. The machine vison utilizing Faster RCNN object detection, for example, can be used to identify that employee and patron contact has occurred by handing an item from one person to another or doing a handshake. At this time, the indicator system can be changed to tell either the employee or patron or both that the event occurred, and that hand sanitization should occur very soon. Hand sanitizer may be provided by the operator. The machine vision can watch the one or both people to ensure they do the hand sanitizing event. Once this is done the indicator light can change from RED to GREEN. Any other event can be tracked like dirty POS, dirty check writing table, dirty conveyer belt, dirty payment terminal, etc. can cause the indicator light to change or messaging be sent to bring cleaning staff to the location. One goal is to give customers and employees the feedback to let them know that they have created a non-clean event and should be notified. In one embodiment, messaging can be sent to customers cell phones to indicate the current cleaning status of the facility. For example, which surfaces that are clean and which are not. A top down view of the store or business will let consumers know where to touch or not touch. This same tool can be used by employees on where to clean next. The machine vision can detect if one or the other person has touched their face which is a severe risk to let bacteria and viruses into the person's body. This may be combined with another at risk event like touching a dirty surface or object. In addition, the machine vision system can detect the at-risk clean event and associated it with biometrics of those people and send them an alert to their pre-registered mobile device. People often do not know the risky events that they do like face touching. Reminders of this can "train" a person to take better caution.

In a fast food business like Chipotle, for example, the machine vision system can track if the cashier touches the dirty POS terminal, a customer's cash, credit card, the patron, and then touches food or surfaces around the food. The employee or employees can be notified by messaging means or indicator lights to let them clean the surface and their hands.

The machine vision system can enforce period cleaning rules for employees. A non-limiting example is that all employees need to hand wash every 30-minutes, if they touch something they shouldn't touch, etc. Then the machine vision system can alert staff in real time that they need to do it now or reports can be delivered to managers of the employee's compliance with the 30-minute clean hand rule. Conversely, the surface cleaning rules for all surfaces in the location can be tracked.

Cookware and utensils and kitchen equipment can be tracked by machine vision and their cleaning frequency can be monitored. As a non-limiting example, if the business has a rule that the grill needs to be cleaned every 30-minutes then the machine vision or other sensor/indicator can show this or trigger messaging to the employees. Management reports can also be created.

Employee clothing like hats, vests, and gowns worn in kitchen or counter settings can be monitored by machine vision system and if compliance requirements are not met by an employee then alerts can be sent to the employee and management. The machine vision can also track if the protective equipment is properly worn as well. Non-limiting examples include a face mask being worn properly over the nose and mouth, a protective hat being worn properly, eye protection being worn, gloves being used, hard hats being worn, proper shoes for the job being worn, hair is properly worn or cut, is inappropriate jewelry being worn, are employee ID tags shown, or is clothing unsafely worn. It is important that employees in factory, health care, and food preparation facilities, jobsite, and other locations wear the appropriate protective equipment for their environment and this system can ensure this occurs. Hospital employees may be monitored by machine vision that they are wearing the corrective PPE personal protective equipment and that they change them at important events not limited to leaving one patient, before entering a surgical or a patient treatment procedure. Compliance reports can be created for employees and managers on how well their staff is complying with enterprise or regulatory or trade association rules.

The machine vision or other sensors can also follow each employee using machine vision object tracking in their other job processes as well. This tracking uses image feature extraction to track individual items in the image as they move around. It can track how long they are at each location, how long to perform any event, how much customer interaction is done, etc. This can be used to aid in labor optimization for the business. Biometrics can be implemented and associated with these specific events so detail reports can be generated for each employee. Patron unsafe or unclean events can trigger notifications to the facility staff to take corrective action like clean surfaces, ask the patron to leave or other steps to solve the unsafe or unclean events. Key locations/zones/equipment can be tracked by the sensor/indicator system with or without machine vision and if a customer enters this zone or interacts with these locations or equipment then triggerable events can be raised and corrective action alerts are sent. The mere event of any person or a non-authorized person entering a space can trigger these clean actions.

Tensorflow, Tensorflow Light, Pytorch Image, etc. classification can be implemented to classify any standard object in the world and decide if it needs to be analyzed and tracked for cleanliness or not. ImageNet is a general-purpose image classification library of over one million high resolution images of known objects. These types of objects can be used to aid the SAFE & READY machine vision system decide if a customer or cleaning employee is present. An example is if a cleaning bottle or a rag is seen by the camera then the cleaning state software can say that an employee is present. If a person sits at a table with a plate detected by the machine vision then that person can be determined to be a customer. After that customer leaves, the surface can be marked for cleaning. Object classification and image segmentation can be an important part of the clean surface sensor/indicator system.

Figure 21:
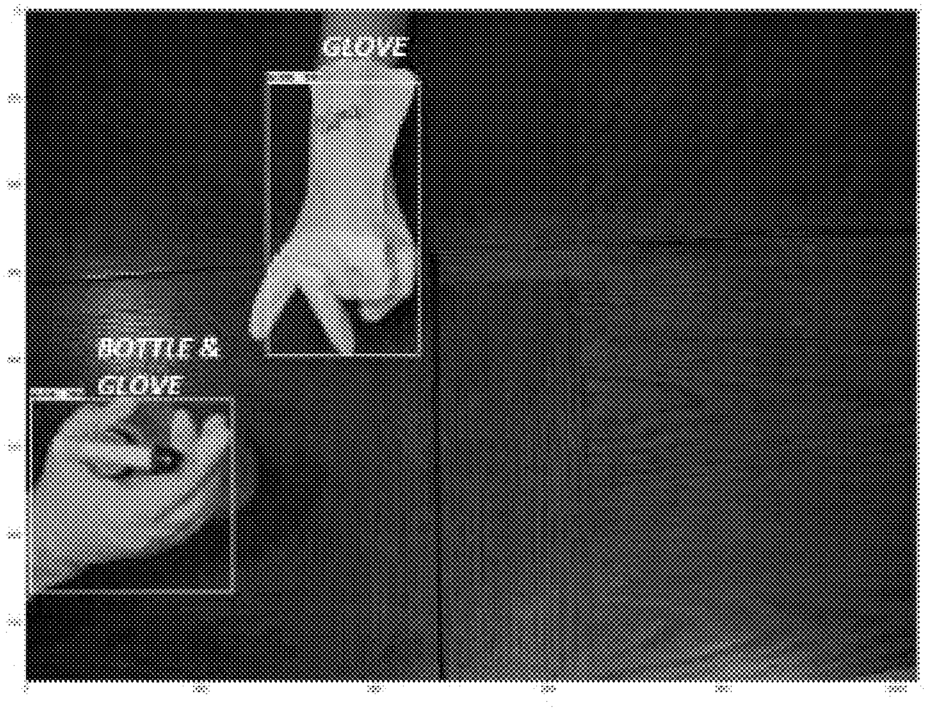
FIG. 21 shows a depiction of a gloves being detected by a machine vision tensorflow based object detector.

FIG. 21 is a camera picture of a tensorflow neural network implementing object detection of a gloved employee doing cleaning and a gloved employee holding a cleaning solution bottle. The neural network can be trained with thousands of real labeled images of hands on various surfaces and synthetically generated images using an Unity3D tool to export images and their respective ground truth object coordinates. All of these images with associated ground truth can be imported into a tensorflow object detection neural network training job to "learn" to recognize these objects at inference time. The precise location of the gloved hands in the image can be noted and each portion of the specific surface cleaned can be tracked. Tensorflow image segmentation can also be used as an alternative. Items other than gloves can be tracked by the machine vision system to denote that this is an employee verses a customer. In addition, or in the alternative, a combination of items or features can be combined to determine that it is an employee.

Figure 22:
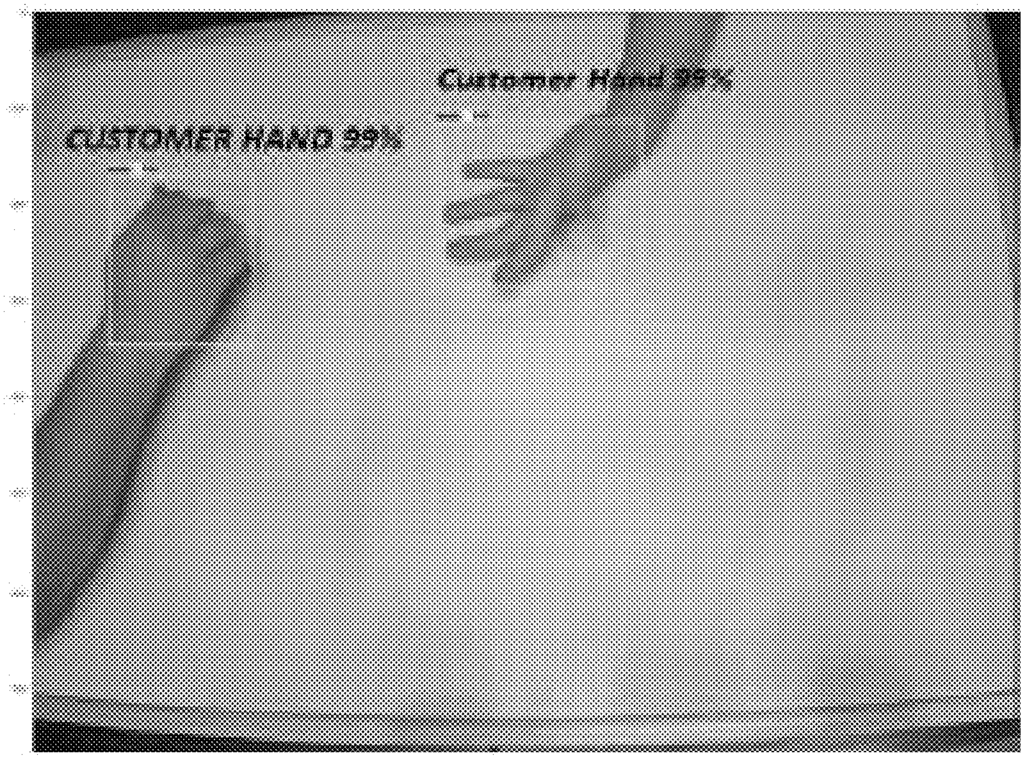
FIG. 22 show a depiction of non-gloved hands on a surface being detected by neural network image processing.

FIG. 22 is a camera picture of a Tensorflow neural network implementing object detection at inference time of a non-gloved patron resting his/hands on or near a surface. This would be a customer's hands and can be tracked and linked to that surface ID. After the customer leaves the surface the machine vision system can alert cleaning personnel to clean that surface. Alternatively, after a certain amount of uses or amount of time the surfaces can be flagged for cleaning. Tensorflow Image, Instance Segmentation, etc. can also be used as an alternative. The precise location of the hands can be noted by the SAFE & READY clean indicator system that uses machine vision. It is noted that any other object in the camera zone on or near a specific surface can be a trigger for cleaning. A non-limiting example, a dining plate, napkins or utensils in the area can be used by the machine vision system to determine that a customer has used this space and the space needs cleaning. Or another example could be in the case of exercise equipment, the presence of a customer towel may also be a trigger. Indicator lights can change during or after the stay of the customer denoting the surface is no longer clean.

Figure 22A:
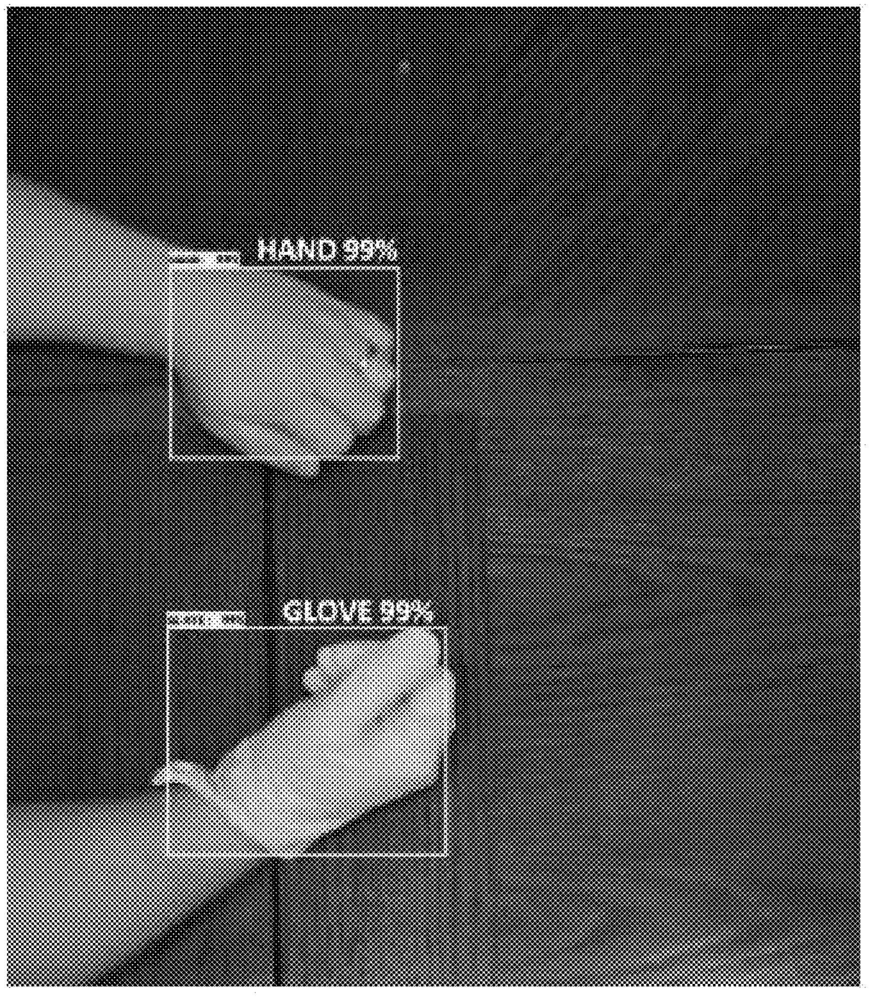
FIG. 22A shows a depiction of both a gloved and non-gloved hand being detected by machine vision.

FIG. 22A is an image of a hand without a glove and a gloved hand on a table. The probability that the object in the image can be determined to 99% by the deep learning object detection. This is a highly accurate classification of these object. The gloved hand can be determined to be a customer hand in this case because it is adjacent to the non-gloved hand and probably belong to the same person due to the direction of the arms in the camera image. Some customers can wear gloves and wristbands that can be detected by the machine vision, which may cause it to think that is a cleaning employee. However, based upon rules the system can decide that this is a patron and not a cleaning personnel. It can use information about how long the person is there and where the persons hands are and the presence of other objects like cleaning bottles or rags can aid the vision system to determine if this is a cleaning attendant or not. The machine vision system can use multiple identifiers on the employees like different pieces of clothing, cleaning materials, biometrics, sensor fusion to determine if an employee is at the surface or a customer or non-cleaning person. Also, the system may be trained for specific gloves and will ignore other gloves. For example, all employees may be required to use a particularly colored or identifiable glove (e.g., it could have a barcode on it). If this identification is not present the glove would not be considered as part of a cleaning event. This system could also be used to enforce compliance—to ensure that employees are using gloves, using gloves of the correct quality, etc. when performing their cleaning duties. Since there are a wide range of qualities of gloves and cleaning chemicals can be potentially dangerous, it is important that employees do not cheat and use thin, disposable gloves that could easily rip. This system can be used to prevent that by detecting such gloves distinctly compared to the correct gloves.

Figure 23:
FIG. 23 shows a detection of two hands shaking via machine vision.

FIG. 23 is a common greeting between people is by handshaking. The machine vision with the deep-learning system can recognize these hand shaking events and send messaging alerts to sensor/indicators in proximity to this event. Alternatively, mobile messages can be sent to these particular pre-registered employees identified by machine vision biometrics like FaceNet or AWS Rekognition, for example. If people stand too close to each other, then a similar event can be triggered. A goal of this hand shaking detection can be to notify people of risky behavior so they can take corrective action. All of these events can be logged into a central cleaning database so reports and compliance reports can be made. Companies may want to enforce restrictions of these types of interactions between employee's and employees and vendors and employees and customers.

Figure 24:
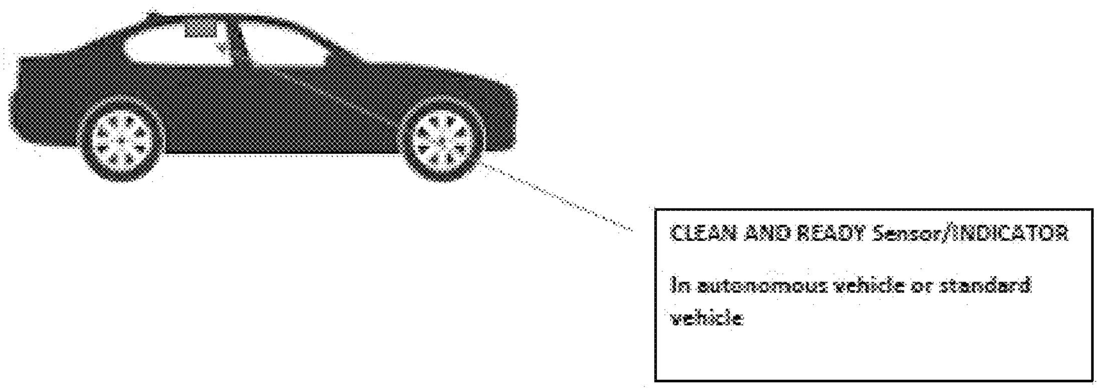
FIG. 24 shows a picture of a vehicle with an exemplary integrated SAFE & READY sensor/indictor system.

FIG. 24 shows that autonomous vehicle cleaning compliance can be implemented by the SAFE & READY cleaning system. Cameras, microphones, proximity sensors, smell detectors and other sensors in the vehicles can sense if the inside and/or outside of the cars are clean after or before use. For example, if a customer vomits in the vehicle the smell sensor can smell (detect) the vomit or the machine vision system can detect the fluid on the surface or the smell of the event. Also, the sounds within the vehicle can be analyzed by neural networks and determinations can be made that the vomit event occurred. Then the autonomous vehicle is sent to a cleaning attendant or cleaning building after the customer is left off. Items that are left in the vehicles can also be detected and this could be a triggering event. Surfaces can be automatically cleaned with UVC light for a short period of time after the customer(s) leave the vehicle. Cameras and/or other proximity type sensors can be used to denote when the customer has left the vehicle and the automatic UVC cleaning begins. Any dirt or trash left in the vehicle can be detected. The autonomous vehicle system can send an alert to customers and bill them for the added cost of cleaning the vehicle or notify them of items left in the car. The car can be sent directly to go meet up with the customer to return the item. Normally these events are handled by taxi or UBER/LIFT drivers after a customer leaves the car. The machine vision technology, however, can do this monitoring throughout the ride and the clean senor/indicator systems can be triggered for events that are occurring. This technology can ensure the vehicles are clean and ready to be put back into service. The GIG economy can be fully utilized by this cleaning service. The car can be sent to a nearby independent contractor that has his/her cleaning equipment to clean the car. After the vehicle is cleaned it is put back into service for the next customer. This would be the most efficient cleaning process and enable many thousands of cleaners to be employed by the autonomous vehicle company or other entity. This technology can also be deployed in any human or animal transport vehicle whether it is autonomous or not. All surfaces can be monitored for touch by a person or dirtied by a person and can be flagged by the system to be cleaned or not. This can be inside or outside the vehicle. The vehicles can be any type of vehicle including but not limited to people carrying drones, flying vehicles, cars, trucks, trains, boats, and other forms of vehicles.

Figure 25:
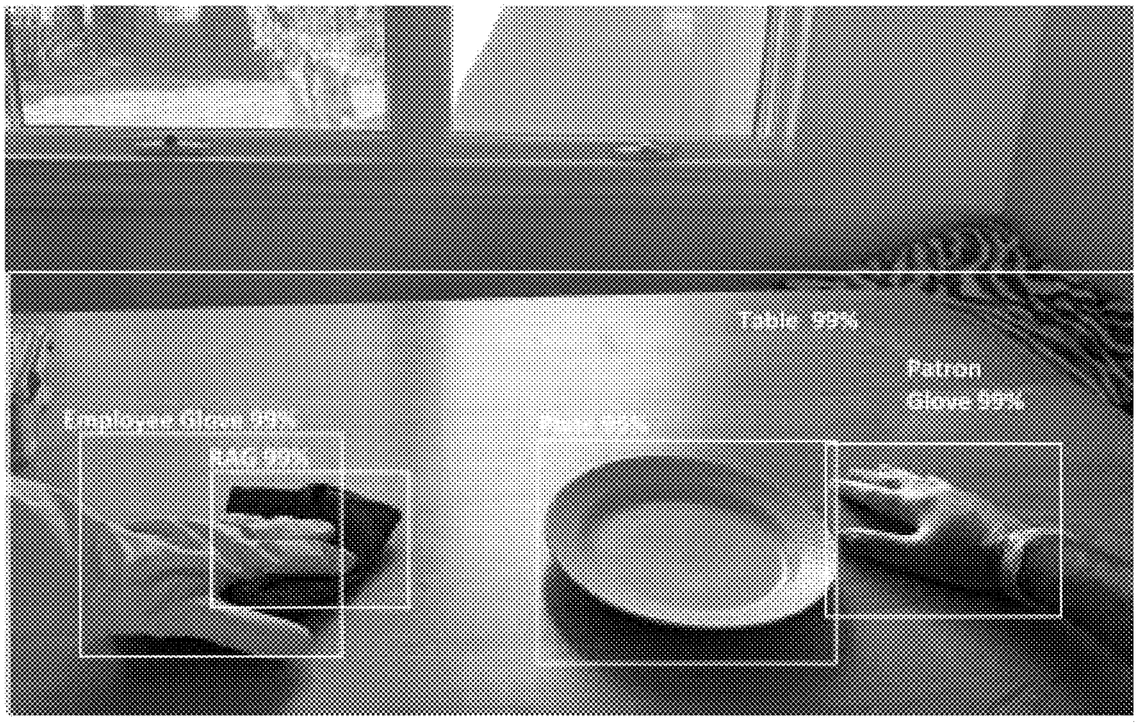
FIG. 25 shows detection, via machine vision, of an employee hand and a customer hand on a table.

FIG. 25 shows an image of a table surface being identified by TensorFlow object detection. In this case the customer hand has been identified differently than the employee hand by type of glove. Most of the public uses single use gloves when they go to retail establishments. Cleaning personal may use special approved color gloves and they are typically much thicker. The plate is closest to the patron glove. The employee glove also has a rag in it. This rag is also trained in the neural network to be identified verses napkins that customers use. This way the neural network and business logic combine two or more identifiers and can include position information to make the determination whether this is an employee or customer hand doing the cleaning. The software can denote that the left side of the table was cleaned, and the right side of the table was not cleaned. Specially marked or patterned gloves or other identifiers can denote employee's verses patrons that also wear gloves. Gloves that are connected to arms of employees using machine vision skeleton analysis can link the glove with the rag in it to the other hand of the same person that is carrying the cleaning fluid. Or the badge or outfit of the employee can be distinguished and read by the machine vision software. Also, the cleaning motion of the hand can be used to decide that one gloved hand is an employee and the other is a customer. This can be accomplished by hand tracking and motion analysis of the movement of the rag and glove on the surface. Size of hands may also be a distinguishing mark to identify employee hands. Similarly motion of the customer's hands, limbs or body can also be tracked and this motion can identify someone eating or working on their computer to denote a customer verses an employee. By knowing the mounting position of the camera, the machine vision network can determine if a person is an employee or customer based upon approved or standard positioning of where employees are. Their hand, arm or body orientation can be used in aiding the identification of an employee or cleaning employee verses a customer.

FIG. 26 shows a flowchart of an exemplary machine vision process. The system receives a signal that the surface is unclean. Then the mask associated with the specific surface within camera field of view is cleared. Next the system receives the object detection input of an action on or near surface. This could be an employee, customer or object interacting with the surface. The decision question is asked: Is the input within the object mask? If NO, then the system continues to look for objects detection. If YES, then mark the matching area within the mask as being cleaner by N %. A non-limiting example is detecting the employee with a cleaning rag that is wiping down a surface. The percentage of surface coverage increments from 0 to ideally 100% as they move the rag over the entire surface. Next the system decides if a certain number keypoints on the surface are covered by the wipedown which would indicate that the employee has completed cleaning the surface. If YES, then a signal is sent that the surface clean is complete. Employee may be given feedback that the job is done. This can be on their mobile phone, a tablet, signage, SAFE & READY sensor/indicator light or display.

The machine vision technology described herein can include edge processors that run out in the location being monitored. The entire video, or still images taken from the camera(s) can be processed locally on these edge processors or sent over a network to onsite or cloud-based servers for processing. The edge or server based processing can implement OPENCV image processing from the OPENCV.org. It implements Tensorflow or Pytorch or other Machine learning frameworks architectures. C++ and Python and Intel Openvino can be used on edge devices and/or associated servers to implement the machine vision and business logic cloud technologies like AWS Sagemaker, AWS GreenGrass, AWS Rekognition, AWS QuickSite, Google, and other shared services can be leveraged to help build the clean compliance eco-system with sensors and indicators on the edge and compute in the cloud.

Edge computing devices, like the Raspberry PI4, NVIDIA Jetson Nano, Intel NUK and other embedded controllers with integrated or connected camera can be used. Mobile phones and tablets and other consumer devices are contemplated as edge processors that exist in the cleaning compliance eco-system system described in this invention. These devices have network ability to communicate to a server and the ability to interface to sensors and indicators needed for the cleaning compliance system. Any device that can implement inference at the edge at an acceptable framerate to capture cleaning activity and occupancy of customers/employees can be used. Alternatively, the camera feed can be a dumb IP based camera that streams images/video to onsite or cloud-based services that do all the machine vision and deep-learning.

Edge computing devices can also just be indicator lights that are connected over a network to cloud services and are triggered to change their indicator status (color) upon business rules being triggered at the server.

Other systems owned other entities can subscribe to the camera feeds, the cloud messaging events, and the transaction logs of all events for their properties. This can be done using messaging brokers, API interfaces, full data dumps as needed, etc.

Edge devices can be configured to securely communicate over HTTPS to servers to protect the data in transit. Lambda functions in AWS, Microsoft Azure, or Google Cloud can receive/send the communication from/to the edge devices. Edge devices can have full download capability using the IOT infrastructure of AWS GreenGrass. This download capability allows for a continuous deployment of the latest neural network models and business logic to meet business needs. Edge devices can employ certificates to ensure they are not tampered with.

The server infrastructure can be a multi-tenant system that supports multiple business partners and all their clean surface sensor/indicators to be accounted for in their reporting and administration needs.

In the preferred embodiment, the cameras perform local edge processing of the video to decide if a cleaning type event or needs cleaning events occurs. These events can trigger indicators to change CLEAN/NOT CLEAN state and messages to employees and consumers that the surface needs to be cleaned.

An exemplary embodiment includes a clean surface sensor/indicator. The clean surface sensor/indicator includes a sensor that can detect a cleaning event occurrence. The sensor can differentiate other non-cleaning event from cleaning events. The sensor can be a surface clean/dirty indicator. The sensor/indicator can be part of a compliance system to log cleaning events and provide reports. For instance, the indicator changes from a non-clean to cleaned status based upon cleaning of the surface or other pre-defined rule. The sensor can be a device(s) based on machine vision technology.

Machine vision can also do or include the following:

- Machine Vision/Object recognition can distinguish between an employee and a consumer at the same position by something that the employee is wearing or is doing.
- A means of distinguishing an employee at a workstation by some worn device such as a tag or a magnet to capture an employee action such as cleaning their hands.
- A means of monitoring social distancing positions marked on the floor or some other area of interest and determining if a consumer is inside or outside the social distancing area. This could be tied to an alert system to indicate social distancing is not being followed.
- A means of using a consumer's personal phone as an indicator that something or a location is safe—either through GPS or proximity to a beacon or NFC. The consumer can open an app and look for cleanliness on a store map, do a search, etc.
- A means of a consumer sending an alert from their phone if they feel something or a location is not clean.
- A means of using object detection to monitor traffic patterns and send an alert if someone is going the wrong way in an aisle. Some stores now are making aisles "one-way." This could trigger an employee to talk to a customer.
- Configuration tool/engine/wizard.
  - The configuration tool can have a set of cleaning procedures mapped to different pieces of equipment so that when a piece of equipment (e.g. a check stand) is added to the configuration, the tool automatically offers from a set of predetermined cleaning procedures that the user can choose from.

The configuration tool can have a set of cleaning supplies mapped to different cleaning procedures and quantity used per cleaning so that when a cleaning is configured (e.g. a check stand), the tool automatically suggests a series of cleaning supplies (Clorox, Lysol, etc.) that the user can choose from. Or they can enter their own custom cleaning supply.

At the end of configuration, the tool can build a document set of how to clean—a training guide.

At the end of configuration, the tool can build a list of cleaning supplies and a schedule for re-purchase—it tracks and determines how often they clean and how much they will use so it can auto-order.

The tool can include a means of recommending a cleaning procedure from the configuration tool. For example, if a check stand is added as a piece of equipment or item to be cleaned, the tool can determine and generate a recommended cleaning routine and have a mapped document.

The tool can include a means of having different cleaning frequencies or cleaning procedures by day and time or based on number of people in location or based on number of uses. Each of these is a trigger. The configuration wizard can include all these adjustments.

An auto-audit tool/engine/wizard can be used as a means of asking the system for an "audit". The system can create an audit routine—e.g., cleaning personnel need to go to these locations and check cleanliness; cleaning personnel need to check on cleaning history of these items; etc. This can be done periodically by the internal teams to make sure they are being compliant. The system can track, record, and retain success of the audit or failure of the audit.

A "diamond certified" designation of a "clean" location that that the business needs to earn can be used to develop a registry that monitors locations who want to be considered diamond certified. This could be published in a directory that is searchable by the consumers.

A means to automatically file compliance reports to a third party agency. For example, if the CDC monitors cleanliness or the county of Alameda monitors cleanliness, the system can be queried on demand or could file a weekly or monthly status report to the CDC or county automatically. The system can send daily reports to executives on cleaning.

A means of ingesting (receiving) customer complaints about cleanliness automatically so that no one needs to enter them.

A means for the consumer to give reviews.

A means of posting cleanliness to social media or to the company website from the system's operating platform—e.g., a means of having a daily or on demand job to pull data and send it to Instagram, Twitter or other social media platform.

A means of tagging a cleaning supply or a cleaning implement (spray bottle, UVC wand, broom) with a physical NFC tag or a label that can be seen by a camera that is picked up when it is being used and is automatically captured as an event into the system.

The system can include use of an API that third-party systems or tools can query or send information into the system. For example, a third-party data analytics tool can pull data to visualize. Or cleaning equipment like a hand washer which has an employee ID system already can send "employee #XYZ just cleaned their hands at station 123 at date/time" into the system as a record. Or, a traffic volume sensing system can be used to know how many people are in the store. The system can use an open API for consuming data generated or sending in new data.

Supermarket/Grocery Store deployment of Safe N Ready Sensor/Indicator

A configurator or configuration tool can be used to define equipment in store, define all cleaning processes, set cleaning schedule for each item needing cleaning and select cleaning supplies, etc. This can be as simple as "turn on" cleaning guidance and start receiving cleaning dispatches.

Wearable tags on employees can be used to verify employees are following self-cleaning procedures at hand-washing stations.

Occupancy sensors can be used to determine when a customer has been at a location to trigger cleaning needs to be done (e.g. customer was at check stand or ATM). Rules can be applied to occupancy (e.g. 5 customers have been to the register) to alter cleaning.

Remote electronic buttons with red/green LEDs can be used to indicate an area is clean or needs to be cleaned.

Configurator rules and a dispatch system can be used to send guidance to cleaning employees and/or change LED on remote electronics that cleaning needs to be done—based on time or on occupancy or another rule. The system can optimizes cleaning staff and minimize costs.

AI/cameras can be used to capture cleaning has been done in aisles, at check stands and other places; send the data to the system.

A configurator can be used to create rules to modify the cleaning procedures based on occupancy, volume of customers or date/time. It is contemplated for the system to be adaptive.

An "opening" process for the store to be followed can be created each day and documented; clean each room, sterilize implements, etc.

A "closing" process for the store can be created to be followed each day and documented.

AI and cameras mounted at check stands can be used to enforce social distancing in line.

SAFE & READY labels can be placed on each shopping cart to indicate cleaning has been done.

Dentist Office deployment of Safe N Ready Sensor/Indicator.

An "opening office" process for the office to be followed can be created each day and documented; clean each room, sterilize implements, etc.

Wearable tags on employees can be used to verify employees are following self-cleaning procedures at hand-washing stations.

Occupancy sensors can be used in each room to direct cleaning after use; room has remote electronics that turns red and a dispatch is sent that the room needs to be cleaned.

Cameras can be used to verify cleaning procedures are being followed and capture cleaning; data send to system.

Remote electronics at sterilizer can be used or API feed can be taking from the sterilizer to indicate whether tools have been cleaned. Employees can use wearables to tap into remote electronics or sterilizer could send data directly to system.

Remote electronics with a red/green LED can be used to indicate a room has been cleaned; green LED means room is safe to enter.

A cleaning summary can be generated and sent each day or on some period. This can be filed automatically with some governing body (e.g. county or health department).

A camera in each room can be used to indicate that employees must look at with their PPE to verify that they are properly equipped before attending to a patient.

SAFE & READY label on x-ray or other equipment can be used to show that it has been cleaned; patient can see that it's been cleaned and it's safe to use.

A "closing" process for the office can be used to be followed each day and documented; clean all rooms, sterilize implements, etc.

Elementary and High Schools use cases.

A configurator can be used to define equipment in each classroom and around school, define all cleaning processes, set cleaning schedule for each item needing cleaning and select cleaning supplies. It can be as simple as "turn on" cleaning guidance and start receiving cleaning dispatches.

An "opening classroom" process can be created to be followed each day and documented; clean each room, clean desks, clean equipment (e.g. lab equipment), etc. before students can use the classes.

A "closing" process for the office can be created to be followed each day and documented; clean all rooms, clean desks, clean equipment (e.g. lab equipment), etc. before closing school.

Remote electronics with a red/green LED can be used to indicate a room has been cleaned; one could be outside each classroom or on individual desks in the classroom; green LED means room is safe to enter.

Mobile tools can be used to send updates to parents and students that classes are clean and ready for the day.

Remote electronics with a red/green LED can be used to indicate equipment, restrooms or other items have been cleaned; green LED means item is safe to enter, or equipment is safe to use.

SAFE & READY labels (or other timer-based devices) on each desk can be used to show it has been cleaned.

Wearable tags on students and teachers can be used to verify that self-cleaning procedures are being followed—when students go to bathroom, they must scan themselves at the hand washing station.

Occupancy sensors can be used in each room to direct cleaning after use; room has remote electronics that turns red and a dispatch is sent to cleaning staff that the room needs to be cleaned. This assumes that many schools share classrooms between multiple classes per day.

A cleaning summary can be generated and sent each day or on some period. This can be filed automatically with some governing body (e.g. county or school district or health department).

A camera at the doorway of each room can be used to show that students and employees must look at with their PPE to verify that they are properly equipped before attending to a class.

AI and cameras mounted in public areas (e.g. cafeteria) can be used to eliminate need for staff to verify cleaning has been done.

A configuration tool can be used to create optimal cleaning process so that resource efficiency can be maximized and achieve cost savings.

A configuration tool can be used to optimize use of cleaning supplies and achieve cost savings.

AI and cameras mounted around areas where students line up can be used to enforce social distancing in line.

Fitness Centers (large and small) use cases.

A configurator can be used to define equipment and locations in the health club, define all cleaning processes, set cleaning schedule for each item needing cleaning and select cleaning supplies. This can be as simple as "turn on" cleaning guidance and start receiving cleaning dispatches.

An "opening gym" process can be created to be followed each day and documented; clean or check each piece of equipment or each area before members can use the equipment or area.

A "closing gym" process can be created to be followed each day and documented.

Wearable tags on staff can be used to verify that self-cleaning procedures are being followed—when staff uses the bathroom, they must scan themselves at the hand washing station.

Remote electronics with a red/green LED can be used to indicate a room or area (e.g. locker room or racquet ball court) has been cleaned by a staff member; green LED means room is safe to enter.

Mobile tools can be used to send updates to members that classes are clean and ready for the day.

Remote electronics with a red/green LED can be used to indicate equipment, restrooms or other items have been cleaned; green LED means item is safe to enter, or equipment is safe to use.

SAFE & READY labels (or other timer-based devices) on each piece of workout equipment can be used to show it has been cleaned.

Remote deployed electronics at each piece of equipment can be used by cleaning personnel that cleaning has occurred. Red/green LED indicates cleanliness.

Occupancy sensing in remote deployed electronics can be used to indicate a piece of equipment needs to be cleaned after use; eliminate un-necessary cleaning.

Functions can be integrated to the occupancy system to adjust cleaning frequency based on number of patrons.

A configuration and dispatch tool can be used to optimize cleaning so that smaller staff can do the cleaning.

A gym floor visualizer can be used to allow members to see a real-time view of equipment and rooms and see where the clean machines are. The floor can be color coded—clean equipment is blue (green), equipment needing cleaning is red and occupied equipment is yellow.

AI and cameras mounted around areas where members queue can be used to enforce social distancing.

AI/cameras can be used to capture cleaning has been done in public places (e.g. looking at weight machines and fitness equipment; send the data to the system.

The system can allow for participation in the Certified Clean program with a sticker on the front window. This may require the location to share data about cleaning to the system.

Public Transportation use cases.

A configurator can be used to define cleaning for different types of equipment on different lines and schedules. This can be as simple as "turn on" cleaning guidance and start receiving cleaning dispatches to remote workers.

A "put into service" process can be created to be followed each day and documented when the bus comes into service; clean each seat, clean floors, clean handles, clean bathrooms; capture cleaning and send to system.

A "put out of service" process can be used to be followed each day and documented when the bus goes out of service; clean each seat, clean floors, clean handles, clean bathrooms; capture cleaning and send to system.

A SAFE & READY label on chairs or other equipment can be used to show that it has been cleaned; customer can see that it's been cleaned and it's safe to use.

Occupancy sensors in each chair can be used to direct cleaning after use; each seat has remote electronics that turns red and a dispatch is sent that the room needs to be cleaned.

Wireless or 5G connected remote devices can be used to communicate back to the central servers because all equipment is remote, not like an office.

If the public transport cleaning crew uses any form surface cleaning sterilizer, fogger or UVC to clean, have it transmitted the cleaning to the system via API.

Nail Salons (or beauty parlors or hair salons) use cases

An "opening store" process can be created to be followed each day and documented; clean each room, clean each chair, sterilize equipment, clean each bathroom, etc.

Wearable tags on employees can be used to verify employees are following self-cleaning procedures at hand-washing stations.

Occupancy sensors in each chair can be used to direct cleaning after use; each seat has remote electronics that turns red and a dispatch is sent that the room needs to be cleaned.

Cameras can be used to verify cleaning procedures are being followed and capture cleaning; data sent to system.

Remote electronics can be used at sterilizer or an API feed can be taken from a sterilizer to indicate whether tools have been cleaned. Employees can use wearables to tap into remote electronics or sterilizer could send data directly to system.

A cleaning summary can be generated and sent each day or on some period. This can be filed automatically with some governing body (e.g. county or health department).

A camera at each chair can be used to identify employees that must look at with their PPE to verify that they are properly equipped before attending to a customer.

A SAFE & READY label can be used on chairs or other equipment to show that it has been cleaned; customer can see that it's been cleaned and it's safe to use.

A "closing" process can be used to be followed each day and documented; clean each room, clean each chair, sterilize equipment, clean each bathroom, etc.

The system can facilitate participation in the Certified Clean Program with a sticker on the front window. May requires the location to share data about cleaning to the system.

AI and cameras mounted in waiting areas can be used to enforce social distancing in line or waiting.

Commercial Offices use cases.

An "open the office" process can be created to be followed each day and documented when the office is opened; clean each desk, clean floors, clean handles, clean bathrooms; capture cleaning and send to system.

A "close the office" process can be created to be followed each day and documented when the bus goes out of service; clean each desk, clean floors, clean handles, clean bathrooms; capture cleaning and send to system.

Remote red/green LED indicators at entrances can be used to the office and in common areas to show employees the cleanliness status. Indicators change color based on cleaning or need to clean.

Remote electronics at common areas such as bathrooms, break rooms, conference rooms, shared spaces can be used to capture cleaning activity; data is sent to system.

Occupancy sensors in common areas or at shared desks can be used to know when employees have used them; adjust cleaning schedule or dispatch cleaners.

Employee activated remote sensors can be used to check into or check out of shared spaces like conference room; when a meeting is done, the employee will push a button indicating that the conference room needs to be cleaned which dispatches a cleaning staff.

Hydrochromic labels on handles and other surfaces used by employees can be used to indicate when a surface is clean or needs to be cleaned.

AI/cameras can be used to capture cleaning has been done in common areas, at desks; send the data to the system.

A configurator can be used to create rules to modify the cleaning procedures based on occupancy, volume of employees or date/time. It is contemplated for the system to be adaptive.

Sit Down Restaurants use cases.

An "open the restaurant" process can be created to be followed each day and documented when the office is opened; clean each desk, clean floors, clean handles, clean bathrooms; capture cleaning and send to system.

A "close the restaurant" process can be created to be followed each day and documented when the bus goes out of service; clean each desk, clean floors, clean handles, clean bathrooms; capture cleaning and send to system.

Remote sensors at all employee areas; kitchen, check in station, water stations, bar, and other places can be used to identify employees interact to change or see cleanliness status.

SAFE & READY labels at each table and public area can be used to indicate surface cleanliness. These change when an employee has cleaned the surface, and gives customers an indication that surface was recently cleaned.

The system can generate cleaning data to certify the restaurant is certified clean. The restaurant can place stickers in the windows, on the restaurant marketing materials, on social media and on a "Certified Clean" website.

A mobile app can be used to allow customers to report unclean or unsafe areas as part of a Certified Clean program.

An occupancy sensor can be used to determine when a customer has been at a table to trigger cleaning needs to be done.

Wearable tags on employees can be used to verify employees are following self-cleaning procedures at hand-washing stations.

If the restaurant cleaning crew uses any form of cleaner/sterilizer, fogger or UVC to clean, have it transmitted the cleaning to our system via API.

Day Care Centers use cases.

An "open the center" process can be created to be followed each day and documented when the day care is opened; clean each play area, clean floors, clean toys, clean handles, clean bathrooms; capture cleaning and send to system.

A "close the center" process can be created to be followed each day and documented when the day care closes; clean each play area, clean floors, clean toys, clean handles, clean bathrooms; capture cleaning and send to system.

Remote sensors at all employee areas; kitchen, desks, and other places that employees interact can be used to change or see cleanliness status.

SAFE & READY labels around play areas can be used to indicate surface cleanliness. These change when an employee has cleaned the surface, and gives parents and employees an indication that surface was recently cleaned.

The system can generate cleaning data to certify the day care is Certified Clean. The day care can place stickers in the windows, on marketing materials, on social media and on Certified Clean website.

A mobile app can be used to allow parents to report unclean or unsafe areas as part of a Certified Clean program.

An occupancy sensor can be used to determine when a kid has been at a table to trigger cleaning needs to be done.

Wearable tags on employees can be used to verify employees are following self-cleaning procedures at hand-washing stations.

A user can use the system audit capability to generate random audit tests to verify cleaning, capture results into system.

If the day care cleaning crew uses any form of sterilizer, fogger or UVC to clean, have it transmitted the cleaning to the system via API.

Supermarket/Grocery Store use cases.

A configurator can be used to define equipment in store, define all cleaning processes, set cleaning schedule for each item needing cleaning and select cleaning supplies. This can be as simple at "turn on" cleaning guidance and start receiving cleaning dispatches.

Wearable tags on employees can be used to verify employees are following self-cleaning procedures at hand-washing stations.

An occupancy sensor can be used to determine when a customer has been at a location to trigger cleaning needs to be done (e.g. customer was at check stand or ATM). Rules to occupancy (e.g. 5 customers have been to the register) can be applied to alter cleaning.

Remote electronic buttons with red/green LEDs can be used to indicate an area is clean or needs to be cleaned.

A store visualizer can be used to allow customers to see a real-time view of check stands and services and see where the clean areas are. The floor can be color coded—clean places are blue (green), places needing cleaning are red and occupied equipment is yellow.

Configurator rules and a dispatch system can be used to send guidance to cleaning employees and/or change LED on remote electronics that cleaning needs to be done—based on time or on occupancy or another rule. This an optimize cleaning staff and minimizes costs.

AI/cameras can be used to capture cleaning has been done in aisles, at check stands and other places; send the data to the system.

A configurator can be used to create rules to modify the cleaning procedures based on occupancy, volume of customers or date/time. It is contemplated for the system to be adaptive.

An "opening" process for the store can be created to be followed each day and documented; clean each room, sterilize implements, etc.

A "closing" process for the store can be created to be followed each day and documented.

AI and cameras mounted at check stands can be used to enforce social distancing in line.

SAFE & READY adhesive labels on each cart can be used to capture cleaning has been done.

The system can facilitate participation in the Certified Clean Program with a sticker on the front window. This may require the location to share data about cleaning to the system.

A user can use the system audit capability to generate random audit tests to verify cleaning, capture results into system.

Dentist Office use cases.

An "opening office" process for the office can e created to be followed each day and documented; clean each room, sterilize implements, etc.

Wearable tags on employees can be used to verify employees are following self-cleaning procedures at hand-washing stations.

Occupancy sensors in each room can be used to direct cleaning after use; room has remote electronics that turns red and a dispatch is sent that the room needs to be cleaned.

Cameras can be used to verify cleaning procedures are being followed and capture cleaning; data sent to system.

Remote electronics can be used at sterilizer or an API feed can be taken from the sterilizer to indicate that tools have been cleaned. Employees can use wearables to tap into remote electronics or sterilizer could send data directly to system.

Remote electronics with a red/green LED can be used to indicate a room has been cleaned; green LED means room is safe to enter.

A cleaning summary can be created each day or on some period. This can be filed automatically with some governing body (e.g. county or health department).

A camera in each room can be used to identify employees that must look at with their PPE to verify that they are properly equipped before attending to a patient.

A SAFE & READY label on x-ray or other equipment can be used to show that it has been cleaned; patient can see that it has been cleaned and it is safe to use.

A "closing" process for the office can be created to be followed each day and documented; clean all rooms, sterilize implements, etc.

The system can facilitate participation in the Certified Clean Program with a sticker on the front window. This may require the location to share data about cleaning to our program.

A user can use the system audit capability to generate random audit tests to verify cleaning, capture results into system.

Referring to FIG. 1, an exemplary embodiment can include a workstation monitoring system 100. The workstation 102 is not limited to a place of working, but can be any area, volume of space, surface area, object, etc. The workstation monitoring system 100 can include a camera 104 configured to capture images and/or video of a workstation 102. The system 100 can include one or more cameras 104. The camera 104 can be any one or combination of cameras disclosed herein. The workstation monitoring system 100 can include a monitoring module 106 configured to receive images and/or video from the camera 104. The monitoring module 106 can be an operating module (e.g., hardware, software, firmware, etc.) configured to receive, process, and transmit data. The operating module can include or be in operative association with a processor and a memory.

Any of the processors discussed herein can be hardware (e.g., processor, integrated circuit, central processing unit, microprocessor, core processor, computer device, etc.), firmware, software, etc. configured to perform operations by execution of instructions embodied in algorithms, data processing program logic, automated reasoning program logic, etc. It should be noted that use of processors herein includes Graphics Processing Units (GPUs), Field Programmable Gate Arrays (FPGAs), Central Processing Units (CPUs), etc.

Any of the memory discussed herein can be computer readable memory configured to store data. The memory can include a non-volatile, non-transitory memory (e.g., as a Random Access Memory (RAM)), and be embodied as an in-memory, an active memory, a cloud memory, etc. Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach for controlled and coordinated signal transmission and processing to any other component or combination of components of the communication system. The transmission can be via a communication link. The communication link can be electronic-based, optical-based, opto-electronic-based, quantum-based, etc.

It should be noted that any component of the system can include a transceiver or other communication module to facilitate transfer of data and signals to and from other components of the system.

The system 100 can include a processor 108 (e.g., computer device) to allow a user to exercise command and control of the system 100 and/or allow the system 100 to automatically exercise command and control of various components of the system 100. This can be achieved via use of API, along with command logic, artificial intelligence, automated reasoning, machine learning, etc. The processor 108 can include user interfaces to allow a user to view and control aspects of the system.

The monitoring module 106 can be configured to identify a surface 110 and a state for the surface, the state including any one or combination of occupied, vacant, clean, dirty, contaminated, attended to, or not attended to. The surface 110 can be ay surface within the workstation 102. Occupied can mean that an employee, robot, patron, customer, etc. is within a proximity of the surface. Vacant can mean that an employee, robot, patron, customer, etc. is not within a proximity of the surface 110. Clean can mean that the surface, or at least a predetermined percentage of the surface 110, has been cleaned. This can include being cleaned within a predetermine time period. Dirty can mean that the surface 110, or at least a predetermined percentage of the surface 110, has not been cleaned. This can include not being cleaned within a predetermine time period. Contaminated can mean that, even though the surface 110 had been cleaned, an event caused a contamination of the surface 110. Attended to can mean that an employee, robot, patron, customer, etc. is using or performing an activity on the surface 110. Not attended to can mean that an employee, robot, patron, customer, etc. is not using or not performing an activity on the surface 110.

The monitoring module 106 can be configured to track behavior of an individual, movement of an object, and/or an occurrence for the surface 110 that causes a change in the surface's state. The monitoring module 106 can be configured to generate a trigger event signal based on the change in the surface's state. The trigger event signal can be used to generate a message, can be transmitted to a processor for storage and analysis, can be transmitted to another processor as an alert or for display, etc.

In some embodiments, the camera 104 is configured to capture images and/or video of plural workstations 102. For instance, a restaurant can have a workstation, or plural workstations, in the kitchen, a workstation, or plural workstations, in the dining area, a workstation, or plural workstations, in the employee breakroom, a workstation, or plural workstations, at a handwashing station, a workstation, or plural workstations, in the deep freezer, etc.

In some embodiments, the monitoring module 106 is configured identify plural surfaces 110. For instance, a workstation can include a salad prep portion of a table as one surface 110 and a meat cutting portion of the table as a second surface 110, or a table as one surface 110 and the floor as a second surface 110.

In some embodiments, the system 100 includes an indicator 112, 114 configured to generate a signal representative of the state of the surface 110. The indicator 112, 114 can be any of the indicators/sensors disclosed herein.

In some embodiments, the system 100 includes an indicator placed on or within close proximity of the surface 110. The indicator 112, 114 can be configured to generate a signal representative of the state of the surface 110 after a trigger event signal is generated.

In some embodiments, the system 100 includes a transceiver configured to transmit the trigger event signal to a computer device or a display.

In some embodiments, the monitoring module 106 is configured to generate an audit report and/or a statistical data report. The audit report and/or a statistical data report can include real time surface state status information. The real time surface state status information can include current surface state status information and historical surface state information. These reports can be generated electronically, transmitted to another processor, stored in memory, and/or printed out as hardcopies.

In some embodiments, the surface 110 includes any one or combination of a physical surface, a human surface, or an animal surface. The individual includes any one or combination of a customer, an employee, or a patron. The object includes any one or combination of a physical object, an appendage of a human, or an appendage of an animal.

In some embodiments, tracking behavior involves any one or combination of monitoring physical cleaning of the surface by the individual, how long the individual occupies the workstation 102, how long the individual attends to the workstation 102, whether the occurrence is caused by the individual, etc.

In some embodiments, the object is a cleaning instrument.

In some embodiments, the occurrence includes use of the cleaning instrument.

In some embodiments, the workstation 102 includes any one or combination of a restaurant, a table at a restaurant, a store, a point of sale station at a store, a gym, fitness equipment at a gym, a classroom, a desk in a classroom, a medical or dental room, medical or dental equipment in a medical or dental room, an autonomous vehicle, a seat within an autonomous vehicle, a handwashing or sanitizing station, a sink at a handwashing station, etc.

In some embodiments, the system 100 includes a sanitization marker 112, 114 including a substrate having a portion configured to transition to and from a first state and a second state. The first state can be generated in an absence of a chemical agent, liquid, or heat. The second state can be generated when the substrate portion is exposed to the chemical agent, liquid, or heat. When in the second state, the substrate portion has a color, transparency, translucence, or reflectance that differs from a color, transparency, translucence, or reflectance of the substrate portion in the first state.

In addition or in the alternative, the system includes a sanitization indicator 112, 114 including an illuminator including a processor configured to generate a first color indicating a clean state and a second color indicating a dirty state. The sanitization indicator 112, 114 includes a sensor configured to receive a message related to the clean state, and transmit said clean state message to the processor. The sensor 112, 114 includes any one or combination of a RFID tag, a NFC tag, a proximity sensor, a magnetic sensor, a motion sensor, a gesture sensor, or a voice command sensor. The processor 108, upon receiving said clean state message, causes the illuminator to generate the first color. The processor 108 includes a timer that causes the illuminator to generate the second color after a predetermined amount of time has elapsed.

In some embodiments, the monitoring module 106 includes artificial intelligence software configured to utilize machine vision and deep learning techniques.

In some embodiments, the monitoring module 106 includes artificial intelligence software configured to utilize machine vision and deep learning techniques. The machine vision and deep learning techniques allow the monitoring module to detect a percentage of surface area that is sanitized by the physical cleaning.

In some embodiments, the system 110 includes an ultraviolet illuminator (e.g., UV-C light) located on or in proximity to the surface. When the occurrence causes the state to change from clean to dirty, or clean to contaminated, or occupied to vacant, the system transmits a command signal to actuate the ultraviolet illuminator.

In some embodiments the system includes a sensor configured to detect whether an individual is within a predetermined distance of the surface before transmitting the command signal to actuate the ultraviolet illuminator. For UV-C light can be harmful to a human, and thus the system can be configured to prevent, or stop, illumination of the ultraviolet illuminator when an individual is detected to be within the predetermined distance.

In an exemplary embodiment, a method for workstation monitoring involves receiving images and/or video of a workstation 102. The method involves identifying a surface 110 and a state for the surface 110, the state including any one or combination of occupied, vacant, clean, dirty, contaminated, attended to, or not attended to. The method involves tracking behavior of an individual, movement of an object, and/or an occurrence for the surface that causes a change in the surface's state. The method involves generating a trigger event signal based on the change in the surface's state.

In an exemplary embodiment, a method for monitoring handwashing involves receiving images and/or video of a handwashing station 102. The method involves tracking behavior of an individual at the handwashing station 102 to assess whether the individual washed their hands in accordance with algorithmic behavior rules. The method involves generating a trigger event signal based on the assessment.

It will be understood that modifications to the embodiments disclosed herein can be made to meet a particular set of design criteria. For instance, any of the components of the system or device can be any suitable number or type of each to meet a particular objective. Therefore, while certain exemplary embodiments of the system and methods of using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiments. Thus, the components, features, and/or configurations of the various embodiments can be combined in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein. Additionally, the disclosure of a range of values is a disclosure of every numerical value within that range, including the end points.

What is claimed is:

1. A workstation monitoring system, comprising:

a camera configured to capture images and/or video of a workstation;

a monitoring module having a tracking engine and an inference engine, wherein:

the monitoring module is configured to receive images and/or video from the camera;

the tracking engine, using a machine vision inference technique, is configured to:

identify, using feature extraction object tracking a surface and a state for the surface, the state including any one or combination of occupied, vacant, clean, dirty, contaminated, attended to, or not attended to; and track, using feature extraction object tracking, behavior of an individual, movement of an object, and/or an occurrence for the surface that causes a change in the surface's state;

the inference engine, using the machine vision inference technique, is configured to receive identification and tracking information from the tracking engine and determine a change in the surface's state based on plural states of the surface and one or more tracked behavior, movement, and/or occurrence for each state of the plural states; and the monitoring module is configured to generate a trigger event signal based on the change in the surface's state.

2. The workstation monitoring system of claim 1, wherein:

the camera is configured to capture images and/or video of plural workstations.

3. The workstation monitoring system of claim 1, wherein:

the tracking engine is configured to identify plural surfaces.

4. The workstation monitoring system of claim 1, comprising:

an indicator configured to generate a signal representative of the state of the surface.

5. The workstation monitoring system of claim 1, comprising:

an indicator placed on or within close proximity of the surface, the indicator configured to generate a signal representative of the state of the surface after the trigger event signal is generated.

6. The workstation monitoring system of claim 1, comprising:

a transceiver configured to transmit the trigger event signal to a computer device or a display.

7. The workstation monitoring system of claim 1, wherein:

the monitoring module is configured to generate an audit report and/or a statistical data report.

8. The workstation monitoring system of claim 7, wherein:

the audit report and/or the statistical data report includes real time surface state status information, the real time surface state status information including current surface state status information and historical surface state information.

9. The workstation monitoring system of claim 1, wherein:

the surface includes any one or combination of a physical surface, a human surface, or an animal surface;

the individual includes any one or combination of a customer, an employee, or a patron;

the object includes any one or combination of a physical object, a robot, an appendage of a human, or an appendage of an animal.

10. The workstation monitoring system of claim 1, wherein:

tracking behavior involves any one or combination of monitoring physical cleaning of the surface by the individual, how long the individual occupies the workstation, how long the individual attends to the workstation, or whether the occurrence is caused by the individual.

11. The workstation monitoring system of claim 1, wherein:

the object is a cleaning instrument and/or an Internet of Things (IOT) enabled cleaning instrument.

12. The workstation monitoring system of claim 11, wherein:

the occurrence includes use of the cleaning instrument and/or the IOT enabled cleaning instrument.

13. The workstation monitoring system of claim 1, wherein:

the workstation includes any one or combination of a restaurant, a table at a restaurant, a store, a point of sale station at a store, a gym, fitness equipment at a gym, a classroom, a desk in a classroom, a medical or dental room, medical or dental equipment in a medical or dental room, an autonomous vehicle, a seat within an autonomous vehicle, a handwashing or sanitizing station, or a sink at a handwashing station.

14. The workstation monitoring system of claim 1, comprising:

at least one of:

a sanitization marker including: a substrate having a portion configured to transition to and from a first state and a second state, the first state being generated in an absence of a chemical agent, liquid, or heat, the second state being generated when the substrate portion is exposed to the chemical agent, liquid, or heat, wherein, in the second state, the substrate portion has a color, transparency, translucence, or reflectance that differs from a color, transparency, translucence, or reflectance of the substrate portion in the first state; or a sanitization indicator including:

an illuminator including a processor configured to generate a first color indicating a clean state and a second color indicating a dirty state; and a sensor configured to receive a message related to the clean state, and transmit said clean state message to the processor;

wherein:

the sensor includes any one or combination of a RFID tag, a NFC tag, a proximity sensor, a magnetic sensor, a motion sensor, a gesture sensor, or a voice command sensor;

the processor, upon receiving said clean state message, causes the illuminator to generate the first color; and the processor includes a timer that causes the illuminator to generate the second color after a predetermined amount of time has elapsed.

15. The workstation monitoring system of claim 1, wherein:

the monitoring module includes artificial intelligence software configured to utilize a deep learning technique.

16. The workstation monitoring system of claim 10, wherein:

the monitoring module includes artificial intelligence software configured to utilize a deep learning technique; and the monitoring module is configured to determine a percentage of surface area that is sanitized by the physical cleaning.

17. The workstation monitoring system of claim 1, comprising:

an ultraviolet illuminator located on or in proximity to the surface;

wherein the occurrence causes the state to change from clean to dirty, or clean to contaminated, or occupied to vacant; and wherein the system transmits a command signal to actuate the ultraviolet illuminator.

18. The workstation monitoring system of claim 17, comprising:

a sensor configured to detect whether an individual is within a predetermined distance of the surface before transmitting the command signal.

19. A method for workstation monitoring, the method comprising:

receiving images and/or video of a workstation;

performing machine vision inferencing by:

identifying, using feature extraction object tracking, a surface and a state for the surface, the state including any one or combination of occupied, vacant, clean, dirty, contaminated, attended to, or not attended to;

tracking, using feature extraction object tracking, behavior of an individual, movement of an object, and/or an occurrence for the surface that causes a change in the surface's state; and determine a change in the surface's state based on plural states of the surface and one or more tracked behavior, movement, and/or occurrence for each state of the plural states; and generating a trigger event signal based on the change in the surface's state.

* * * * *